US011586650B2

(12) United States Patent
Qian et al.

(10) Patent No.: US 11,586,650 B2
(45) Date of Patent: Feb. 21, 2023

(54) METHODS, SYSTEMS AND COMPUTER PROGRAM PRODUCTS FOR DATA SYNCHRONIZATION IN INDUSTRIAL PLANTS

(71) Applicant: Yokogawa Electric Corporation, Musashino (JP)

(72) Inventors: Jinsong Qian, Singapore (SG); Khac Trung Nguyen Nguyen, Singapore (SG)

(73) Assignee: YOKOGAWA ELECTRIC CORPORATION, Tokyo (JP)

(*) Notice: Subject to any disclaimer, the term of this patent is extended or adjusted under 35 U.S.C. 154(b) by 319 days.

(21) Appl. No.: 16/895,205

(22) Filed: Jun. 8, 2020

(65) Prior Publication Data

US 2021/0382915 A1 Dec. 9, 2021

(51) Int. Cl.
*G06F 16/00* (2019.01)
*G06F 16/27* (2019.01)
*G05B 19/418* (2006.01)

(52) U.S. Cl.
CPC ....... *G06F 16/275* (2019.01); *G05B 19/4183* (2013.01); *G05B 2219/31334* (2013.01)

(58) Field of Classification Search
None
See application file for complete search history.

(56) References Cited

U.S. PATENT DOCUMENTS

| 7,222,139 | B2* | 5/2007 | Mau | H04L 69/329 |
| | | | | 707/622 |
| 8,839,124 | B2* | 9/2014 | Justiza | G06F 8/34 |
| | | | | 700/110 |
| 10,416,661 | B2* | 9/2019 | Goldschmidt | H04L 63/00 |
| 2013/0085959 | A1* | 4/2013 | Qian | G06Q 10/06 |
| | | | | 705/343 |
| 2019/0163173 | A1* | 5/2019 | Goldschmidt | H04L 63/00 |
| 2020/0012249 | A1* | 1/2020 | Altendorf | H04W 12/06 |
| 2020/0202471 | A1* | 6/2020 | Barak | H04W 4/021 |

* cited by examiner

*Primary Examiner* — Debbie M Le
(74) *Attorney, Agent, or Firm* — Sheridan Ross P.C.

(57) ABSTRACT

The present invention provides methods, systems and computer program products that enable the optimized synchronization of data between mobile client devices assigned to field operators in an industrial plant and a centralized repository for plant data. The invention optimizes synchronization of data between mobile client devices assigned to field operators in an industrial plant and a centralized repository for plant data by selecting a reduced set of data records associated with a field operator, for data synchronization based on one or more of a set of data record selection parameters, and a set of version synchronization rules to ensure that only data records that are relevant to a field operator's foreseeable activities in a shift are downloaded to the field operator's mobile client device.

20 Claims, 24 Drawing Sheets

METHODS, SYSTEMS AND COMPUTER PROGRAM PRODUCTS FOR DATA SYNCHRONIZATION IN INDUSTRIAL PLANTS

FIELD OF THE INVENTION

The invention relates to the field of industrial plant management, and more specifically to methods, systems and computer program products that enable the synchronization of data between mobile client devices (that are assigned to field operators in an industrial plant) and a centralized repository for plant data.

BACKGROUND OF THE INVENTION

Industrial environments implement process control systems for running and controlling processes for manufacturing, conversion, or production. Process control systems typically include one or more process controllers that are connected to one or more field devices. Field devices, may include valves, valve actuators, switches, and transmitters (e.g. temperature, pressure, level, and flow sensors) located within the industrial environment, and which are configured for physical control functions or process control functions. Examples of field device control functions include opening or closing valves, and measuring process and/or environmental parameters (e.g. temperature or pressure) for controlling one or more processes within the process plant or system.

The physical environment of a plant often comprises a large geographically dispersed system (e.g. a large network of fluid pipelines) or a complex multi-step system (e.g. a large refinery system). The physical environment or industrial environment therefore requires field operators within the plant—who regularly traverse the plant facility, inspect plant assets and field devices and perform various tasks or procedures for handling operations and maintenance of the plant and/or assets or field devices within the plant.

Field operators are provided with mobile client devices having multiple functionalities to enable them to perform their operations and maintenance tasks. FIG. 1, illustrates an exemplary mobile client device 102 of a type that may be assigned to a field operator 104. Mobile client device 102 typically includes a hand-held processor implemented device having data processing functionality, and having wired or wireless data networking or data communication capabilities, as well as a user interface to enable an operator 104 to interact with the mobile client device 102 and perform various tasks.

As shown in FIG. 1, exemplary functionality provided by mobile client device 102 may include one or more of generating, storing, modifying and completing task checklists 106, accessing or reviewing data from reference documents 108 (for example plant manuals, field device manuals or troubleshooting data for one or more field devices), generating and storing notes 110 concerning tasks that have been carried out, tasks that are in progress or tasks that require to be carried out in future, recording or logging field device readings 112 corresponding to one or more field devices, and generating image based, video based or audio based logs or notes 114 using a still camera, a video camera or an audio recording apparatus within the mobile client device 102.

In an embodiment, the mobile client device 102 may comprise a rugged or ruggedized smartphone or tablet or mobile communication device having hardware capabilities that render the device water resistant, dust resistant and/or impact resistant, while simultaneously providing one or more of data processing capability, a keypad based user interface, a touch screen based user interface, an audio based user interface, a data transceiver that enables the device to download from and upload data to other devices, an image camera and image display system, a video camera and video display system, an audio recording and audio reproducing apparatus, and one or more software applications that implement menu based functionality for generating, displaying and modifying one or more of checklists, reference documents, notes, field device readings and image based, video based and audio based logs or notes.

Given the large area covered by a typical industrial plant, and the various structures erected within the plant, and also in certain cases the hazards and dangers associated with enabling wireless communication between mobile client devices 102 and a centralized server or database in the plant, the plant environment (or one or more areas within the plant environment) is routinely without wireless network signal or network connection or having insufficient network coverage.

As a result, and to ensure operative functionality and continuity in every part of the plant, each mobile client device 102 is required to periodically synchronize with a centralized server or database—to download into the mobile client device 102, data required by a field operator 104 from the centralized server or database for the purposes of carrying out one or more operations or maintenance tasks assigned to that field operator 104, and to upload from the mobile client device 102 data that has been generated or modified by the field operator 104 on the mobile client device 102 (for example, logs, notes, field device readings) to the centralized server or database.

FIG. 2 illustrates an exemplary user interface 200 of a type that can be implemented within or accessed from a mobile client device 102 for generating, viewing or modifying data records corresponding to logs or work instructions. Each data record has multiple data fields (for example, one or more of data fields 202 to 214)—including for example, data fields representing as description of a work instruction 210, priority of the work instruction 212, planned start time 202 and planned completion time 204. Individual data records may be generated, viewed, or modified by a field operator 104 through the mobile client device 102, for the purposes of enabling the field operator 104 to complete her/his assigned tasks.

FIG. 3 illustrates a system environment 300, comprising an on-premises server 302 and one or more mobile client devices 304 (any of mobile client devices 304a, 304b up to 304n) each assigned to or used by a corresponding field operator 306a, 306b up to 306n. The system environment 300 illustrates systems of a kind that are relevant to implementation of the teachings of the present invention.

The mobile client devices 304 may be understood as comprising mobile client devices of the type described above in connection with FIG. 1, and may interface with on-premises server 302 for the purposes of (i) downloading into a mobile client device 304, data required by a field operator 306a, 306b up to 306n for the purposes of carrying out one or more operations or maintenance tasks assigned to that field operator, and (ii) to upload from the mobile client device 304 data that has been generated or modified by the field operator 306a, 306b up to 306n to the corresponding mobile client device (for example, logs, notes, field device readings).

On-premises server 302 may comprise any processor implemented server that is communicatively coupled to one or more databases and having network communication capabilities. The on-premises server 302 may be configured to store (i) data records comprising data required by a field operator 306a, 306b up to 306n for the purposes of carrying out one or more operations or maintenance tasks assigned to that field operator—wherein the data records can be downloaded into a mobile client device 304 and (ii) data records that have been generated or modified by any field operator 306a, 306b up to 306n on a corresponding mobile client device 304 (304a, 304b up to 304n) during said field operator's shift or during operations or maintenance tasks carried out by the field operator within the plant and being uploaded to the on-premises server 302.

A mobile client device 304 (304a, 304b up to 304n) may be periodically communicatively interfaced with on-premises server 302 (for example prior to the start of an operator's shift/duties or after the completion of an operator's shift/duties) for the purposes of data synchronization. The data synchronization process comprises (i) downloading from a database, through on-premises server 302, into a mobile client device 304, one or more data records that will be required by the respective field operator 306a, 306b up to 306n and (ii) uploading from the mobile client device 304, through on-premises server 302 and into a database, data records that have been generated or modified by a field operator 306a, 306b up to 306n on a corresponding mobile client device 304 (304a, 304b up to 304n) during said field operator's shift or during operations or maintenance tasks carried out by the field operator within the plant.

As shown in FIG. 3, on-premises server 302 may be configured to enable one or more web clients 310 (operating through remote terminal devices either within the plant or outside of the plant) to access on-premises server 302 through a network 308 (i.e. a communications network such as a local area network, wide area network, or the Internet) and to retrieve plant data records that are stored in a database coupled with on-premises server 302. The one or more web-clients 310 may be used to view data concerning state data, condition data, health data or associated data records corresponding to the plant or one or more assets or field devices within the plant, and optionally to generate or view reports 312 based on such state, condition or health data.

FIG. 4 is a flowchart illustrating conventional method steps involved in data synchronization between a mobile client device and an on-premises server within an industrial plant environment.

Step 402 comprises initiating a first data synchronization session comprising a data download session between a mobile client device operated by a field operator, and an on-premises server. Step 404 thereafter comprises authenticating one or both of the field operator identity and/or identity of the mobile client device—using any one or more of authentication methods known in the art, for instance, entering a required passcode of a kind.

Responsive to successful authentication at step 404, step 406 comprises downloading data (i.e. one or more data records) that is relevant to the field operator, from the on-premises server into the mobile client device. The downloaded data may comprise one or more data records that are relevant to or that are necessary for identifying or executing tasks intended or predicted or scheduled to be undertaken by the field operator within the industrial plant environment.

Upon completion of the data download process, step 408 comprises terminating the data download session between the mobile client device operated by a field operator, and the on-premises server.

At step 410, the field operator executes various tasks that have been assigned to her/him in the industrial plant environment and records data changes or updates on the mobile client device.

At step 412, upon completion of the field operators shift, a second data synchronization session comprising either a data upload session or a data upload and download session may be initiated between the mobile client device and the on-premises server. Step 414 comprises authenticating one or both of the field operator identity and/or identity of the mobile client device—using any one or more of authentication methods known in the art. Responsive to successful authentication at step 414, step 416 comprises uploading one or more data records from the mobile client device to the on-premises server for the purposes of updating data records stored at the on-premises server with the data that has been generated, changed or modified by the field operator on the mobile client device during her/his shift.

At step 418, during the upload process, responsive to detecting any conflicts between versions of data records stored on the mobile client device and versions of corresponding data records stored at the on-premises server, the field operator or a console operator may manually resolve such conflicts by selecting one of the conflicting versions of a data record for being stored on the on-premises server and for deleting or overwriting the other conflicting version(s) of said data record. It would be understood that conflicts between versions of data records typically arise when a field operator generates on the mobile client device a first modified version of a data record (that has been downloaded from the on-premises server onto the mobile client device during a preceding synchronization session), while simultaneously a second modified version of the same data record is generated and saved on the on-premises server by another field operator or console operator. This has been found to happen where multiple field operators may be making changes to the same data record on their respective individual mobile client devices during their respective shifts, and each of these versions is sent to the on-premises server for updating when the respective mobile client devices are communicably coupled with the on-premises server for a data synchronization session.

Step 420 comprises terminating the second data synchronization session between the mobile client device and the on-premises server.

Existing systems for enabling data synchronization between mobile client devices and a centralized server or database suffer from multiple drawbacks.

First, the centralized database or on-premises server 302 usually has a very large number of data records associated with any particular field operator—and not all of the data records are usually required for the purposes of the field operator's upcoming shift activities. Downloading all such data records into a field operator's mobile client device 304 would require transfer of a large amount of unnecessary data before each shift—increasing the time and bandwidth unnecessarily for each such download.

It is also difficult for a field operator to select one or more specific data records for download through the mobile client device 304, given the size limitations of the mobile client device (small display, keypad etc.) and the very large number of data records usually associated with each field operator—which increases the likelihood that a field operator may omit downloading one or more important data records that are required for activities within the upcoming shift or duties, or may unnecessarily download one or more data records that are not relevant for activities within the upcoming shift or duties.

Additionally, one or more data records associated with a field operator may already be downloaded into a mobile client device—and redownloading such data records at each data synchronization session is sub-optimal and results in unnecessary time and bandwidth usage that should be avoided. In cases where a large number of such data records are being downloaded into the mobile client device, despite already being present on said mobile client device, the inefficiencies in time and bandwidth usage can be significant.

Yet further, during synchronization sessions where data records from a mobile client device are being uploaded back onto on-premises server 302, there is a requirement to manually view the data being uploaded, so as to compare the server version of the data record against the mobile client device version of the corresponding data record to ensure that in case multiple versions of the data record exist, the field operator or a console operator can choose which version of the data record is to be maintained on the mobile client device 304 and/or at on-premises server 302. This manual comparison can be very time consuming and tedious, particularly when a large number of data records are being viewed—and also given the display and interface limitations of the mobile client device. Additionally, if the field operator accidentally chooses to maintain the wrong version of a data record and overwrite a more appropriate version of the data record on the on-premises server, this could lead to loss of time and compromising information integrity of the data records, incorrectly performing and executing the assigned operation/maintenance tasks, etc.

Another problem with the existing state of art is that in cases where a data synchronization session between a mobile client device and an on-premises server is interrupted, the entire download process requires to be re-initiated when the data synchronization session resumes or is restarted—which again is both bandwidth and time inefficient.

There is accordingly a need for solutions that enable time and data efficient synchronization of data records between a centralized server/an on-premises server or database and a mobile client device, in a manner that ensures that a field operator has access to all data records necessary to complete her/his tasks during a shift or assignment, while simultaneously ensuring optimized data integrity and data record version control, in order for the operator to perform the operation and/or maintenance tasks with efficiency and effectiveness.

SUMMARY

The present invention provides methods, systems and computer program products that enable the optimized synchronization of data between mobile client devices assigned to field operators in an industrial plant and a centralized repository for plant data.

In an embodiment, the invention provides a method for optimizing data synchronization between an industrial plant database system and one or more mobile client devices. The method commences with retrieving a set of parameters associated with an operator identifier, the set of parameters comprising one or more data record selection parameters, wherein the one or more data record selection parameters define criteria for selecting data records from a first set of data records associated with the operator identifier within a database. A set of synchronization rules associated with the operator identifier are retrieved, the set of synchronization rules comprising one or more version synchronization rules, wherein each version synchronization rule defines criteria for selecting one data record version from among a plurality of data record versions associated with the operator identifier, for synchronization between the database and a mobile client device that has been associated with the operator identifier. Responsive to initiation of a data synchronization session between the mobile client device and the industrial plant database system, the method includes retrieving from the first set of data records associated with the operator identifier, a second sub-set of data records that has been selected based on the set of parameters. One or more data records that have multiple data record versions stored within the database are identified within the second sub-set of data records. A third sub-set of data records is selected from among the second sub-set of data records, said third sub-set of data records comprising at least one of (1) one or more data records from within the second sub-set of data records that have only a single data record version stored within the database, (2) for one or more data records within the second sub-set of data records and that have a plurality of data record versions stored within the database, a selected data record version from among said plurality of data record versions, wherein the selected data record version is selected based on one or more of the version synchronization rules. The mobile client device is thereafter synchronized with the database by transmitting the third sub-set of data records from the database to the mobile client device.

The invention additionally provides a system for optimizing data synchronization between an industrial plant database system and one or more mobile client devices. The system comprises at least one server configured to implement the steps of (i) retrieving a set of parameters associated with an operator identifier, the set of parameters comprising one or more data record selection parameters, wherein the one or more data record selection parameters define criteria for selecting data records from a first set of data records associated with the operator identifier within a database, (ii) retrieving a set of synchronization rules associated with the operator identifier, the set of synchronization rules comprising one or more version synchronization rules, wherein each version synchronization rule defines criteria for selecting one data record version from among a plurality of data record versions associated with the operator identifier, for synchronization between the database and a mobile client device that has been associated with the operator identifier, (iii) responsive to initiation of a data synchronization session between the mobile client device and the industrial plant database system (a) retrieving from the first set of data records associated with the operator identifier, a second sub-set of data records that has been selected based on the set of parameters, (b) identifying within the second sub-set of data records, one or more data records that have multiple data record versions stored within the database, and (c) from among the second sub-set of data records, selecting or receiving a selection of, a third sub-set of data records comprising at least one of (1) one or more data records from within the second sub-set of data records that have only a single data record version stored within the database, and (2) for one or more data records within the second sub-set of data records and that have a plurality of data record versions stored within the database, a selected data record version from among said plurality of data record versions, wherein the selected data record version is selected based on one or more of the version synchronization rules, and (d) synchronizing the mobile client device with the database by transmitting the third sub-set of data records from the database to the mobile client device.

The invention additionally provides a computer program product for optimizing data synchronization between an industrial plant database system and one or more mobile client devices. The computer program product comprising a non-transitory computer usable medium having a computer readable program code embodied therein. The computer readable program code comprises instructions for implementing within a processor based computing system, the steps of (i) retrieving a set of parameters associated with an operator identifier, the set of parameters comprising one or more data record selection parameters, wherein the one or more data record selection parameters define criteria for selecting data records from a first set of data records associated with the operator identifier within a database, (ii) retrieving a set of synchronization rules associated with the operator identifier, the set of synchronization rules comprising one or more version synchronization rules, wherein each version synchronization rule defines criteria for selecting one data record version from among a plurality of data record versions associated with the operator identifier, for synchronization between the database and a mobile client device that has been associated with the operator identifier, (iii) responsive to initiation of a data synchronization session between the mobile client device and the industrial plant database system (a) retrieving from the first set of data records associated with the operator identifier, a second sub-set of data records that has been selected based on the set of parameters, (b) identifying within the second sub-set of data records, one or more data records that have multiple data record versions stored within the database, (c) selecting from among the second sub-set of data records, a third sub-set of data records comprising at least one of (1) one or more data records from within the second sub-set of data records that have only a single data record version stored within the database, and (2) for one or more data records within the second sub-set of data records and that have a plurality of data record versions stored within the database, a selected data record version from among said plurality of data record versions, wherein the selected data record version is selected based on one or more of the version synchronization rules, and (d) synchronizing the mobile client device with the database by transmitting the third sub-set of data records from the database to the mobile client device.

These and other embodiments of the invention are described in more detail below.

BRIEF DESCRIPTION OF THE ACCOMPANYING DRAWINGS

Figure 10:
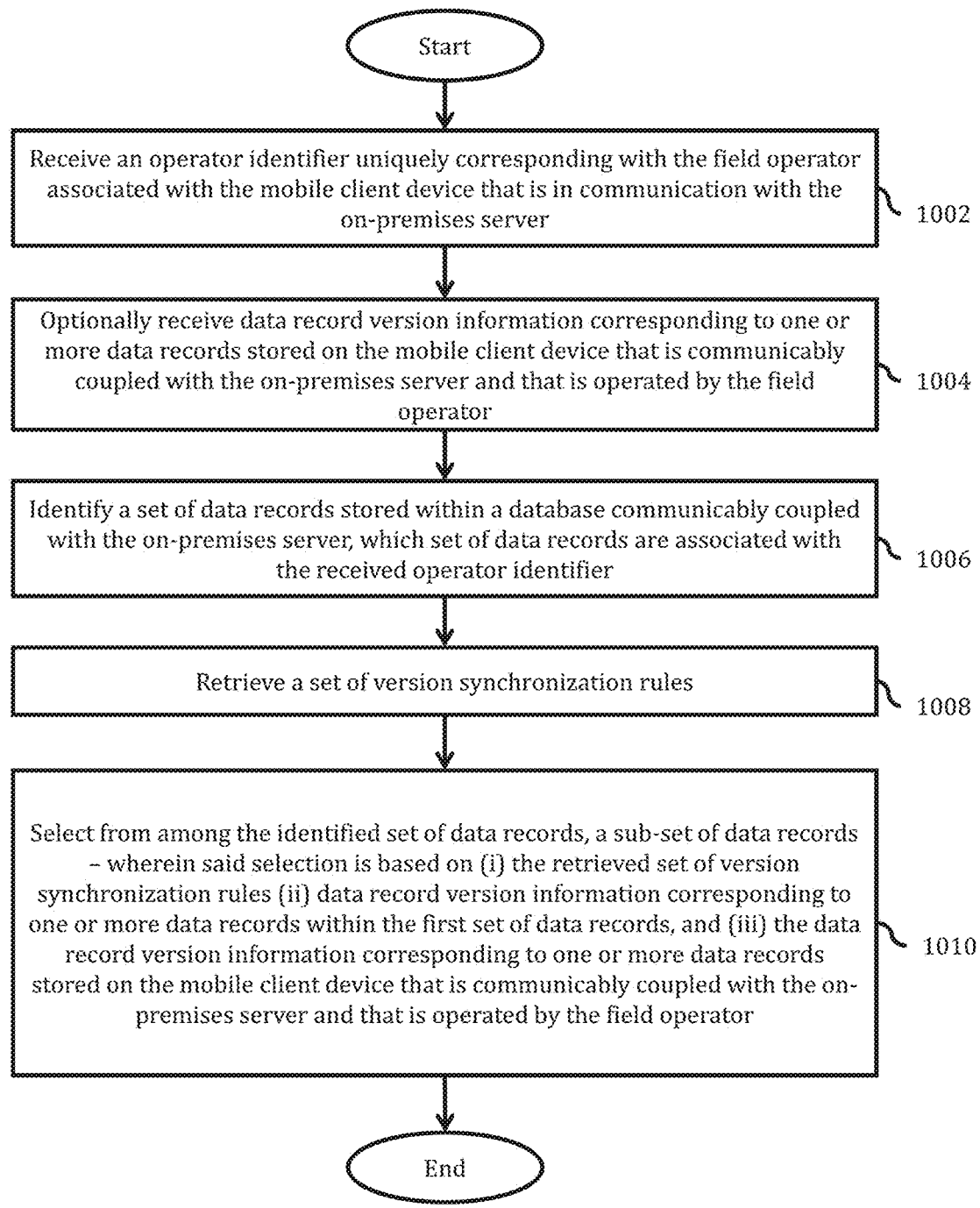

FIG. 10 is a flowchart illustrating method steps involved in identification of a sub-set of data records associated with a field operator, for enabling data synchronization between an on-premises server and a mobile client device when downloading data records from the on-premises server into the mobile client device, wherein the identification is based on data record selection parameters and version synchronization rules.

Figure 11:
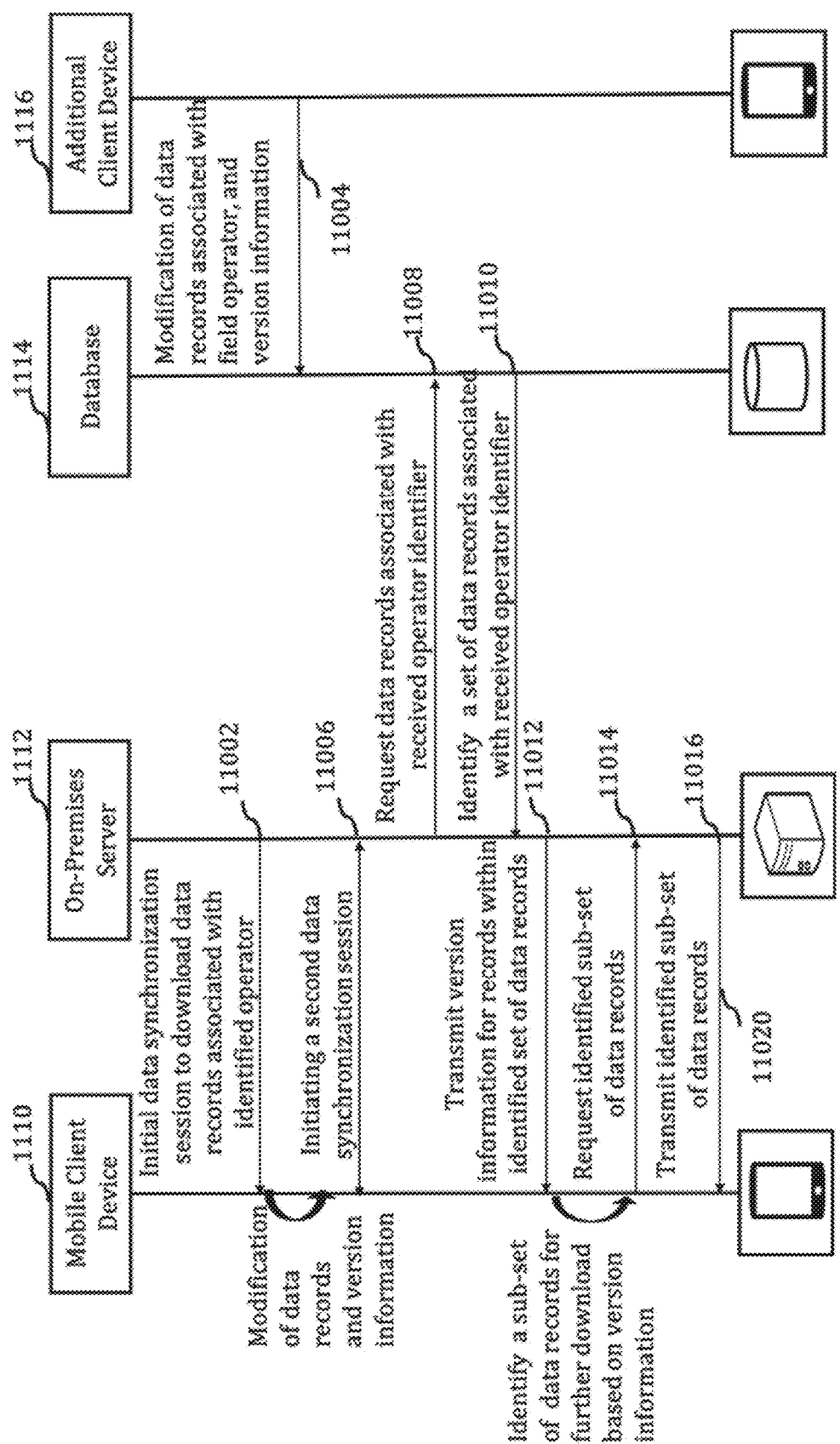

FIG. 11 is a communication flow diagram illustrating communication flow between entities for the purposes of data synchronization between an on-premises server and a mobile client device for downloading data records from the on-premises server into the mobile client device, wherein the data synchronization is based on version information corresponding to data records already available on the mobile client device.

Figure 12:
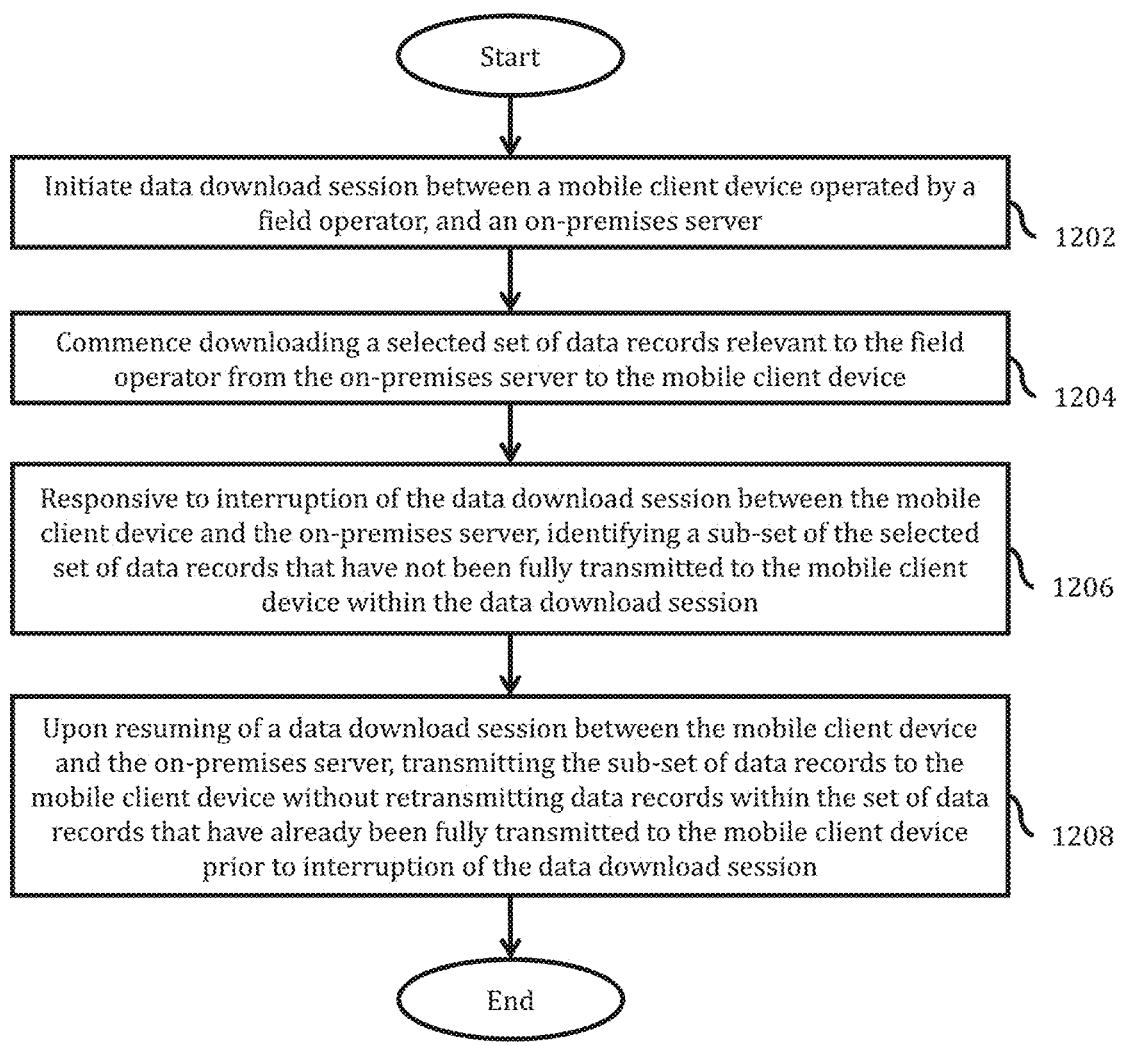

FIG. 12 is a flowchart illustrating method steps involved in data synchronization between an on-premises server and a mobile client device when downloading data records from the on-premises server onto the mobile client device, for implementation in response to interruption of the data synchronization session.

Figure 13:
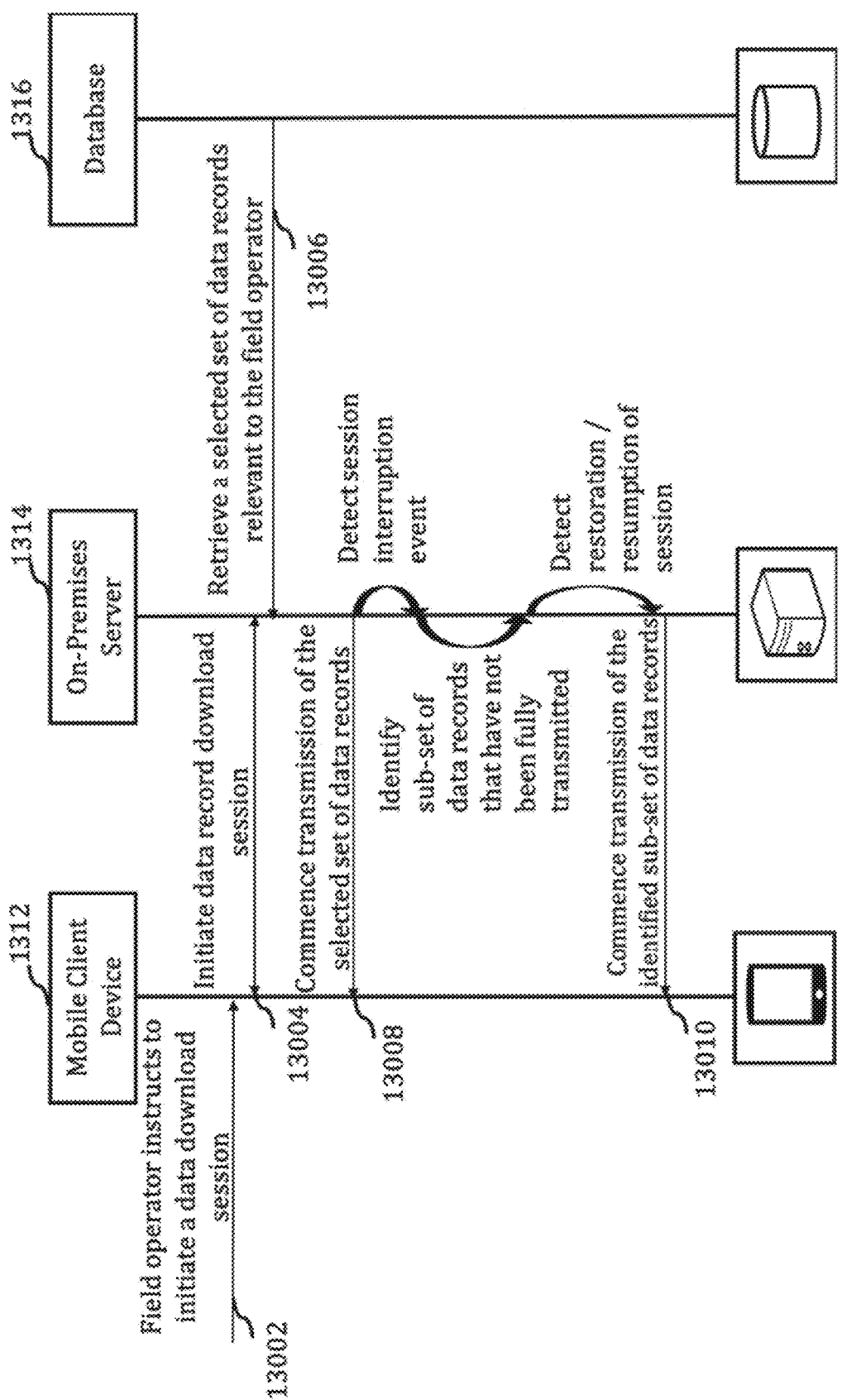

FIG. 13 is a communication flow diagram illustrating communication flow between system entities, for the purposes of data synchronization between an on-premises server and a mobile client device when downloading data records from the on-premises server into the mobile client device, for implementation in response to interruption of the data synchronization session.

Figure 14:
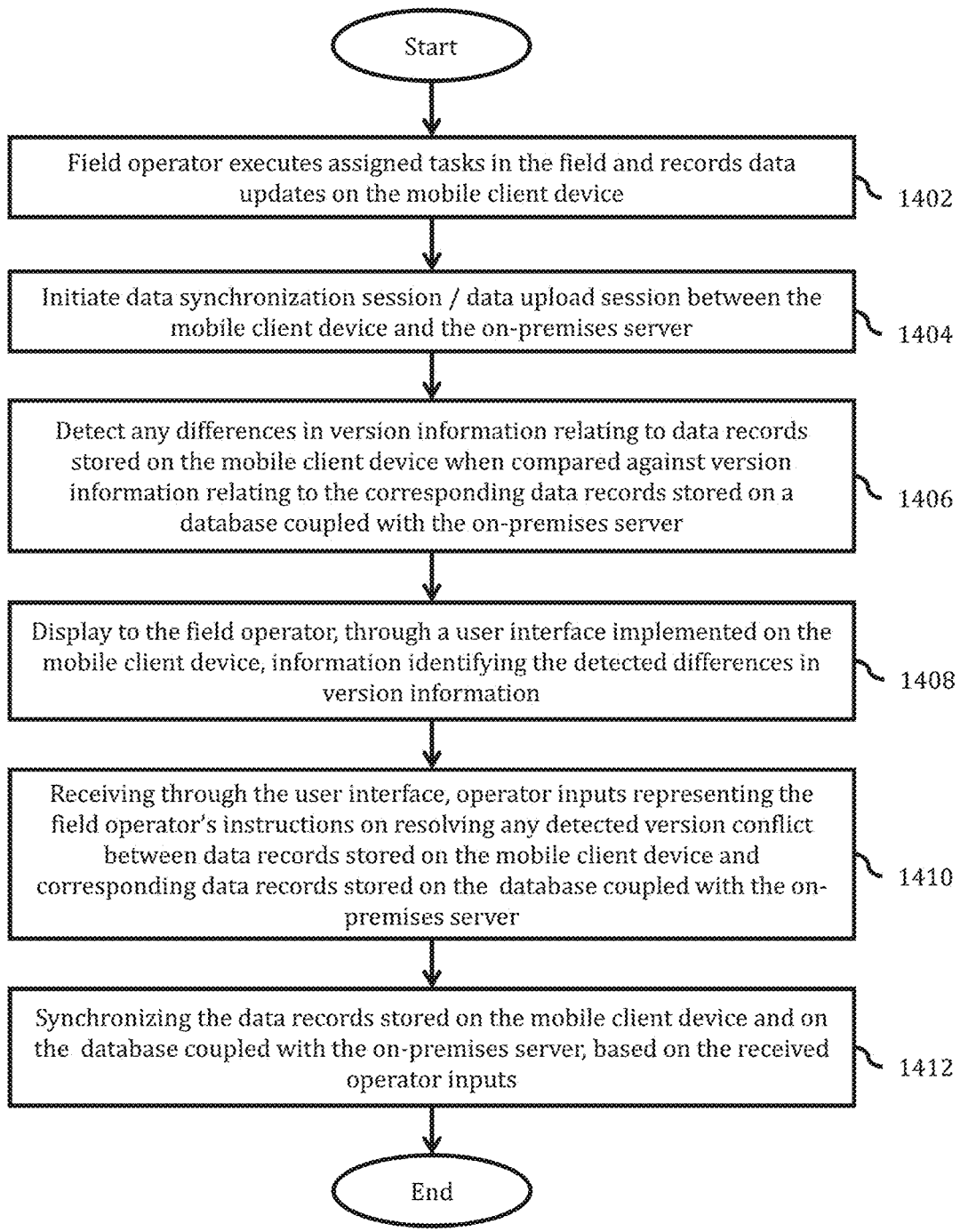

FIG. 14 is a flowchart illustrating a method of enabling field operator based resolution of data record version conflicts through a mobile client device interface.

FIGS. 15 to 18 illustrate exemplary mobile client device interfaces for enabling a field operator to resolve data record version conflicts.

Figure 19:
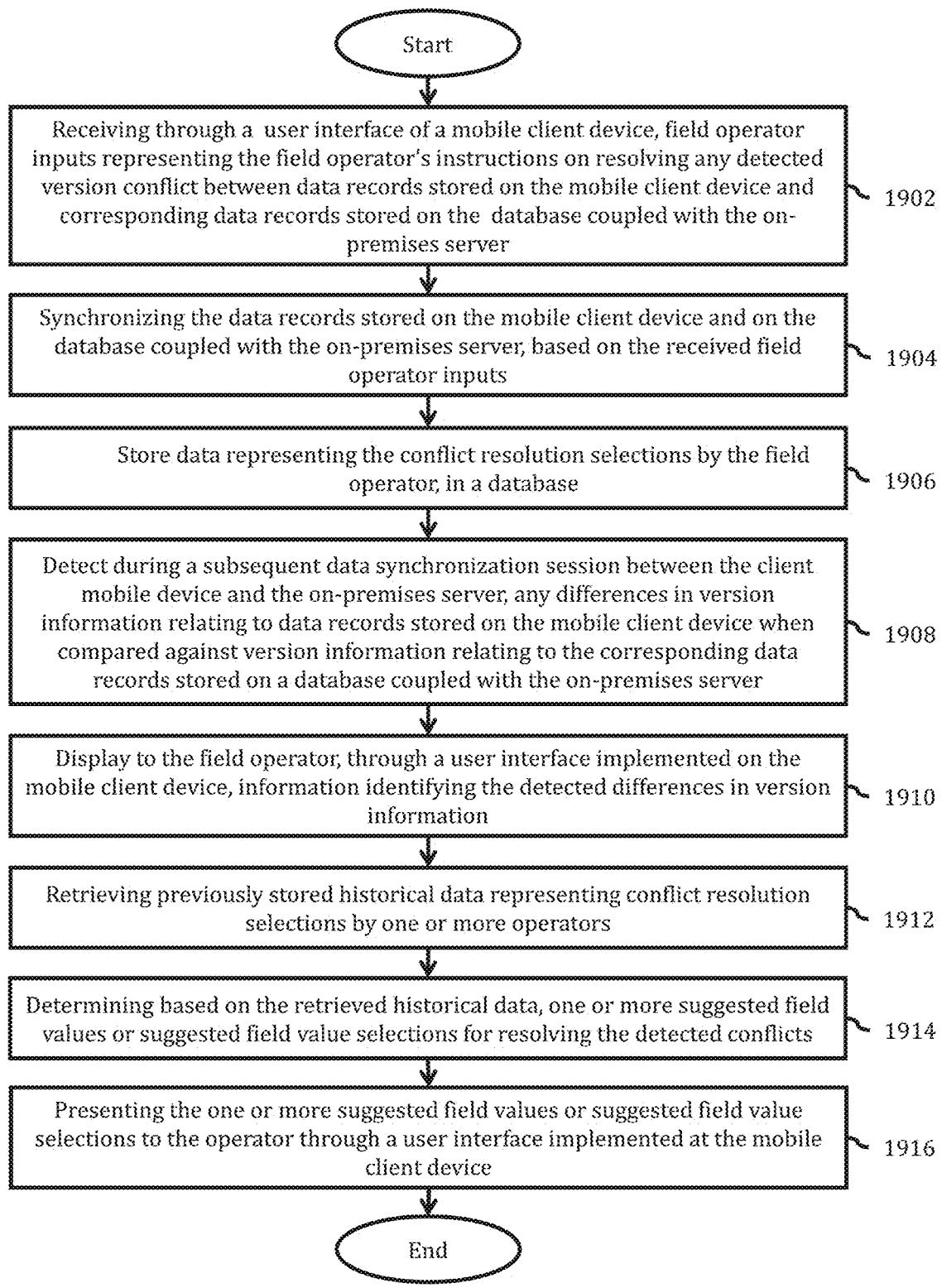

FIG. 19 is a flowchart illustrating a method for enabling resolution of data record version conflicts between a mobile client device and an on-premises server, based on historical data.

Figure 20:
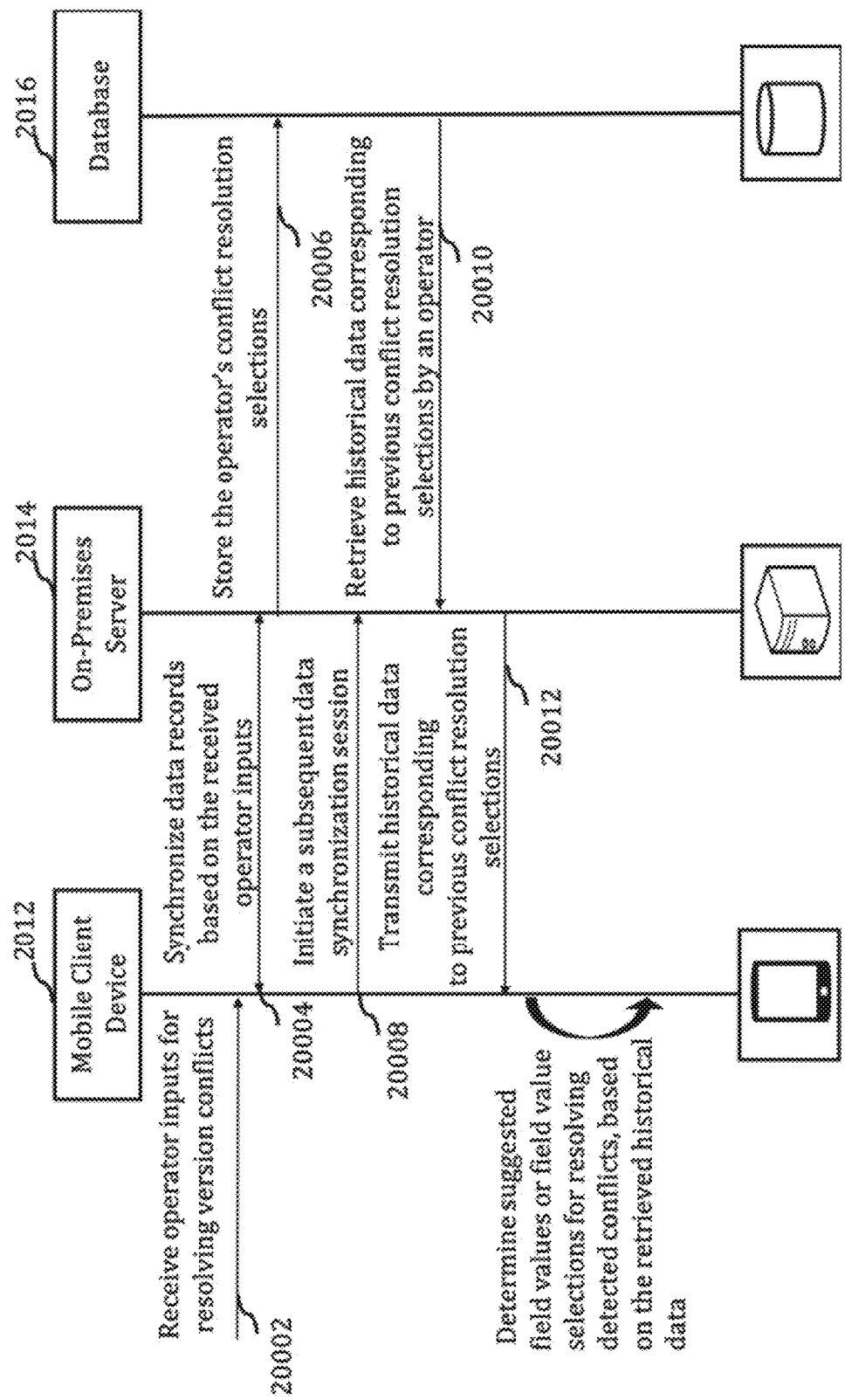

FIG. 20 is a communication flow diagram illustrating communication flow between system entities for implementing a method for enabling resolution of data record version conflicts between a mobile client device and an on-premises server, based on historical data.

Figure 21:
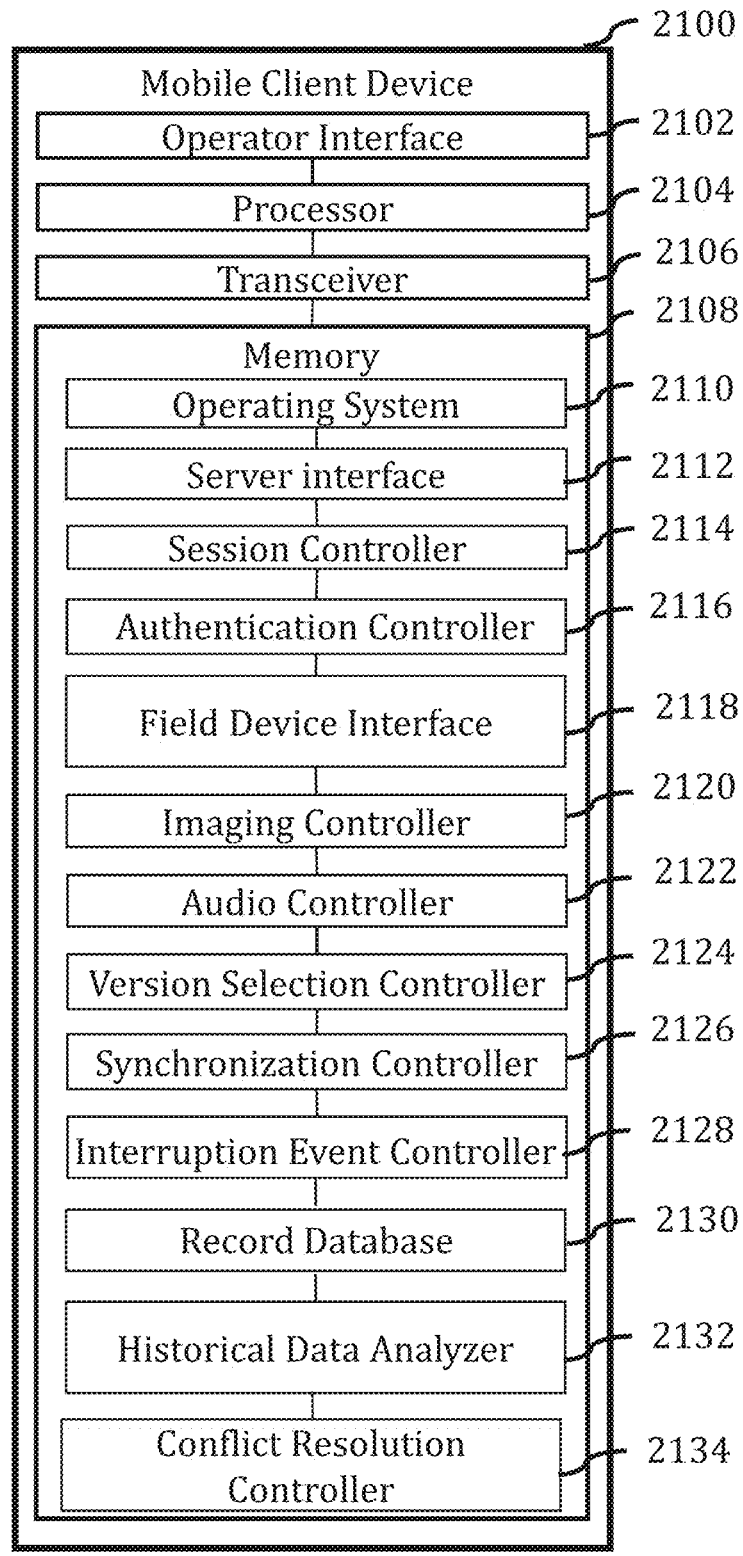

FIG. 21 illustrates an exemplary embodiment of a mobile client device configured in accordance with the teachings of the invention.

Figure 22:
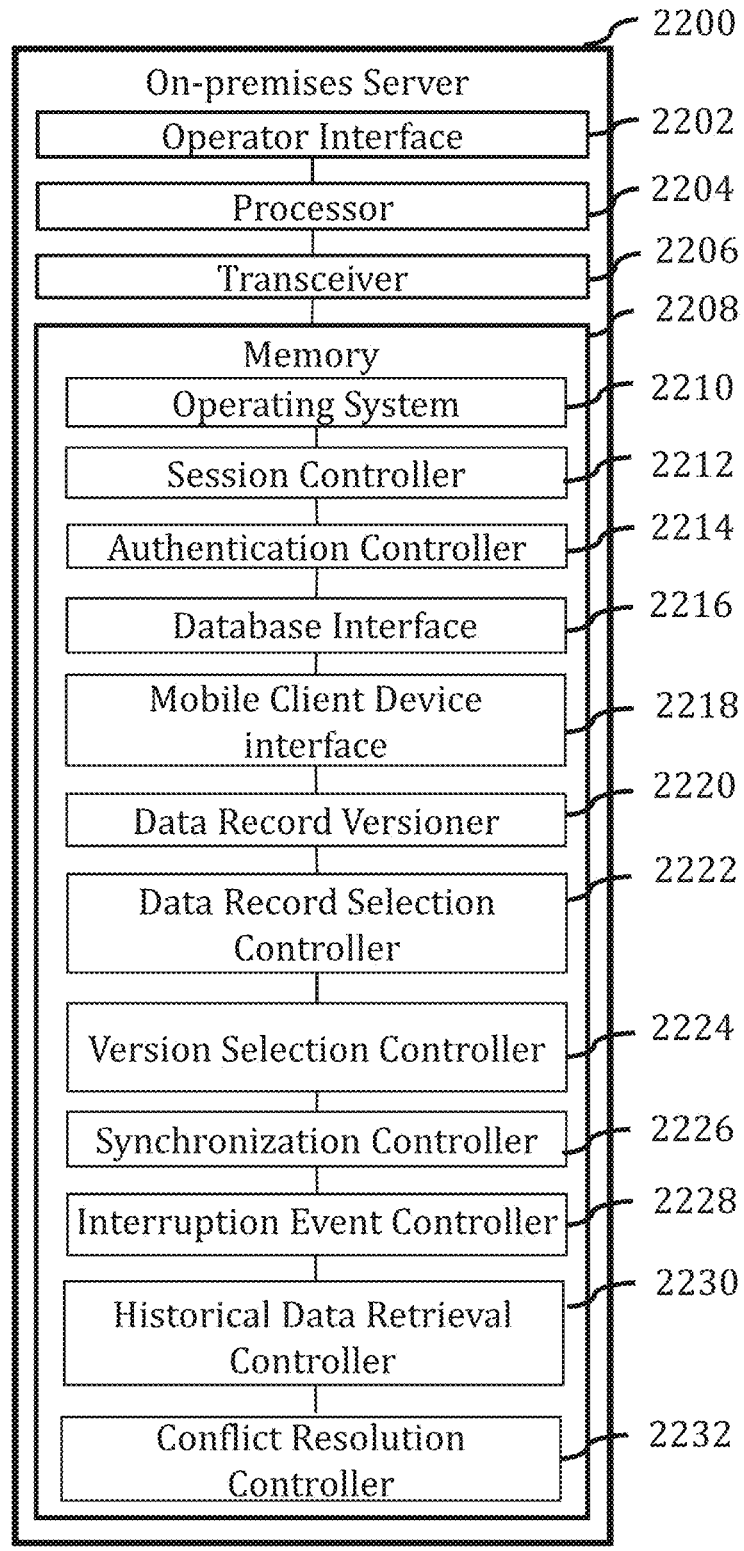

FIG. 22 illustrates an exemplary embodiment of an on-premises server configured in accordance with the teachings of the invention.

Figure 23:
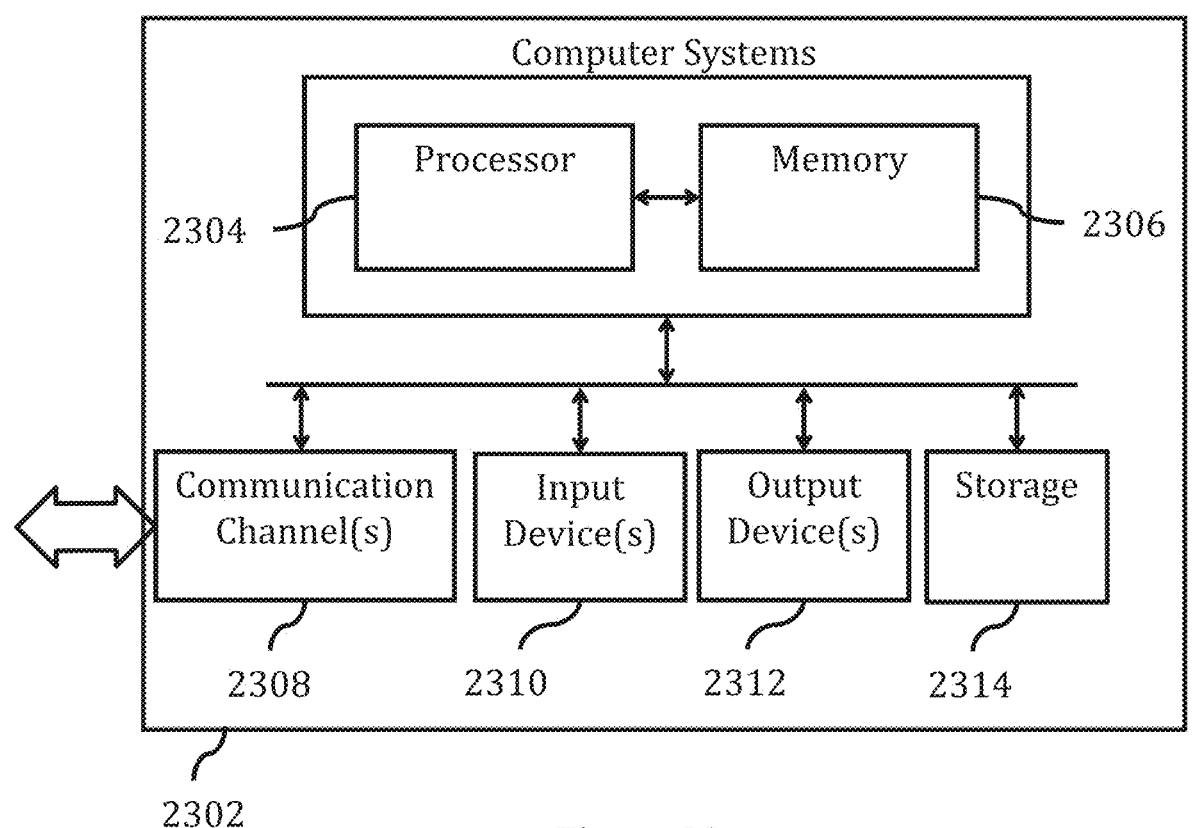

FIG. 23 illustrates an exemplary computer system according to which various embodiments of the present invention may be implemented.

DETAILED DESCRIPTION

The invention provides methods, systems and computer program products that enable optimized synchronization of data between mobile client devices assigned to field operators in an industrial plant, and a centralized server or repository for plant data.

In an embodiment, the invention enables reduction of the number of data records that are required to be downloaded into a field operator's mobile client device during data synchronization. The invention achieves this by enabling a field operator (or a console operator) to define one or more data record selection parameters—which enable parameter or criteria based selection of data records from among the entire set of data records associated with said field operator—such that only those data records that satisfy the one or more data record selection parameters are downloaded into a mobile client device associated with the field operator during a data synchronization session.

For example, a field operator may specify one or more of selection parameters including but not limited to: time a data record was created, a particular shift time, status of a particular task associated with a data record (e.g. pending, completed etc.), a particular group of field operators or plant employees who have shared ownership of a data record etc.—and only those data records that satisfy the one or more specified data record selection parameters will be selected for download from an on-premises server 302 into a corresponding mobile client device 304 during a data synchronization session between the on-premises server and corresponding mobile client device.

Figure 1:
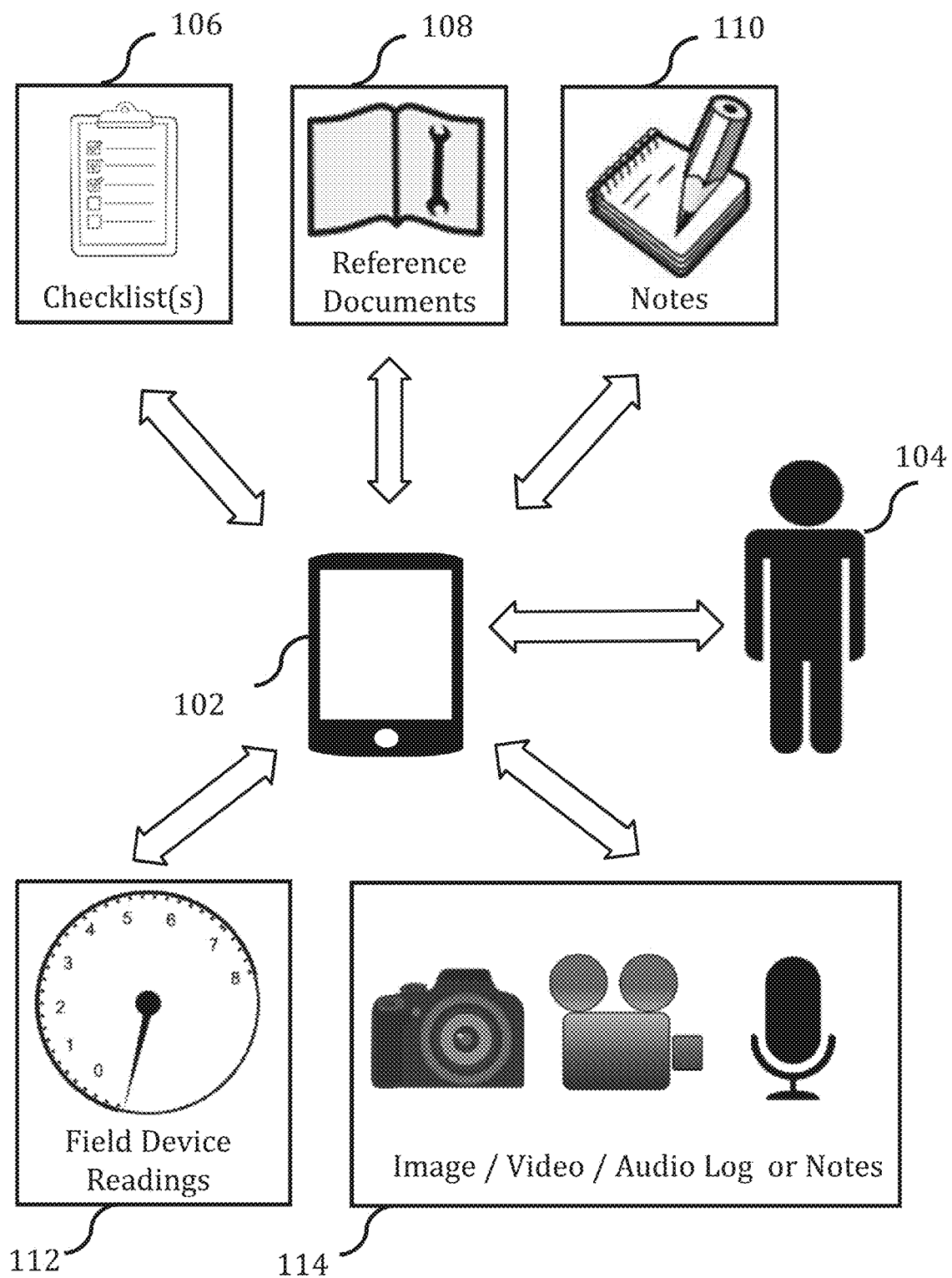
FIG. 1 illustrates an exemplary mobile client device of a kind that can be assigned to a field operator within an industrial plant environment.
Figure 2:
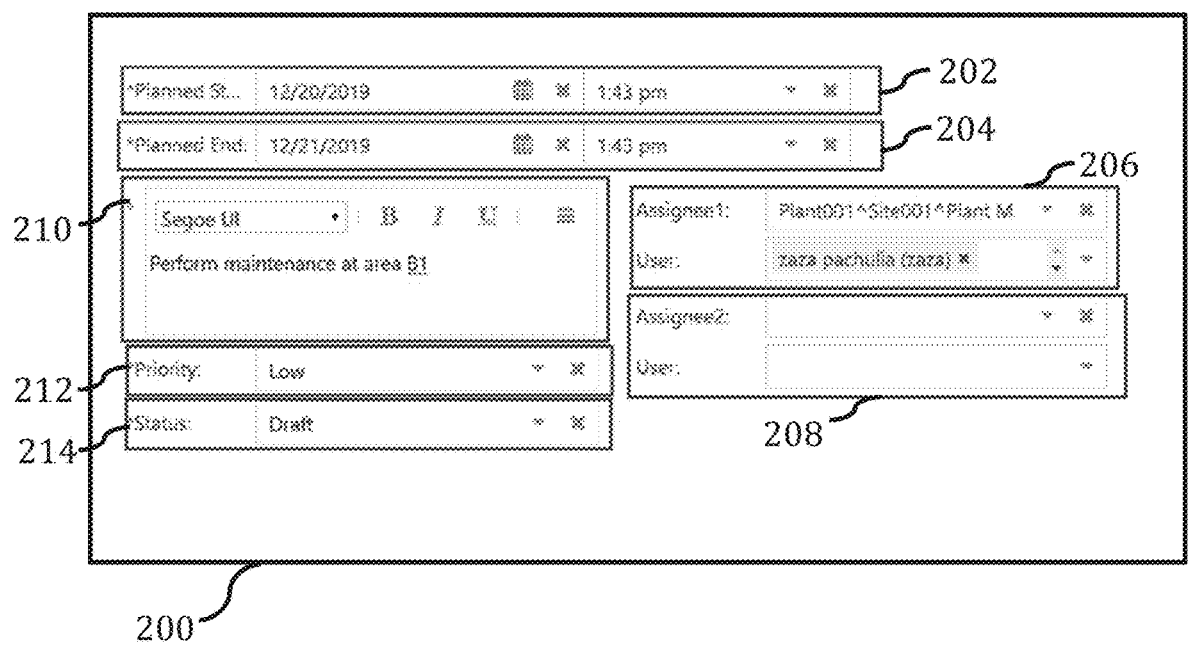
FIG. 2 illustrates an exemplary user interface that can be implemented within or accessed from a mobile client device for generating, viewing or modifying data records corresponding to logs or work instructions.
Figure 3:
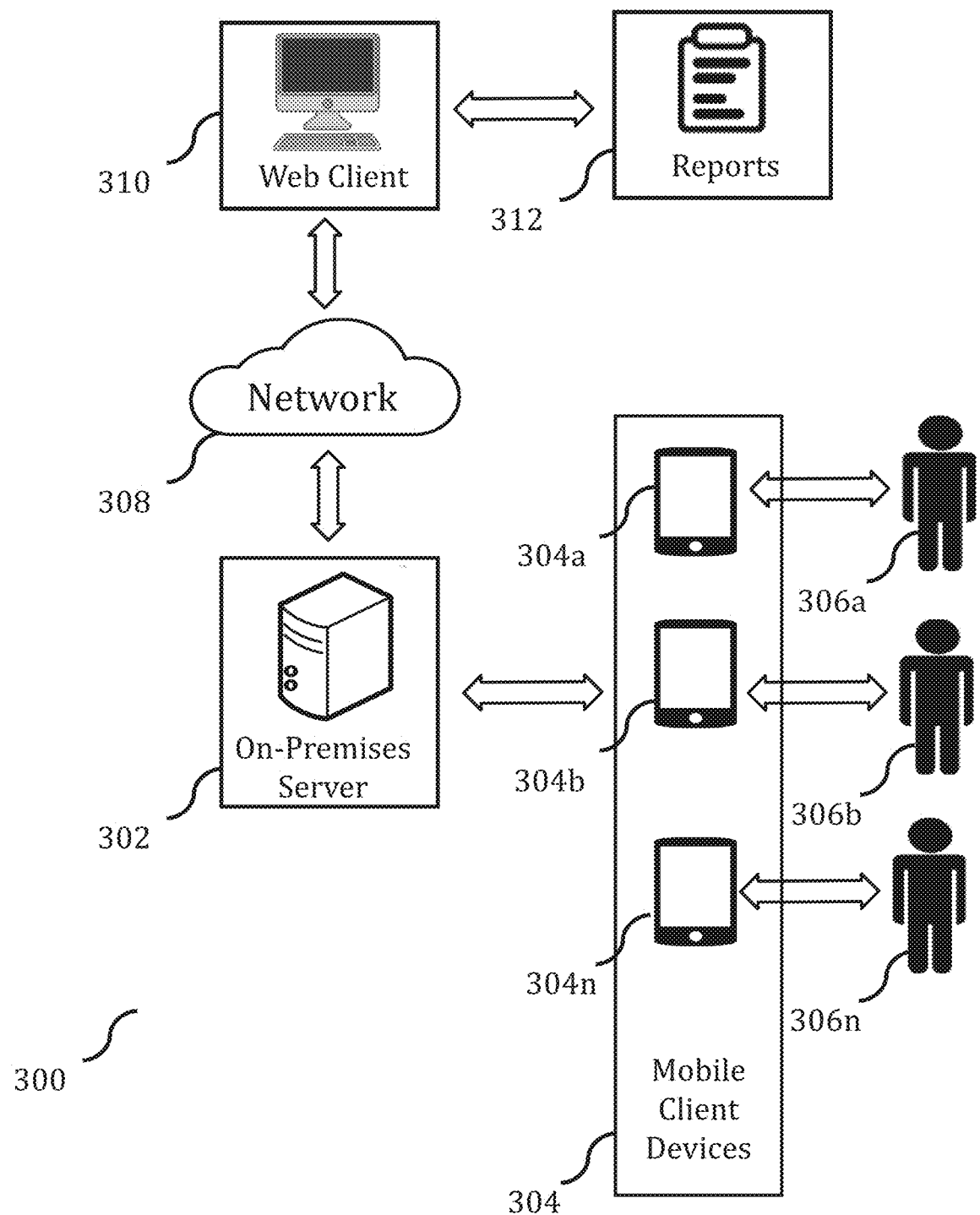
FIG. 3 illustrates a system environment comprising an on-premises server and one or more mobile client devices that may be implemented within an industrial plant environment.
Figure 4:
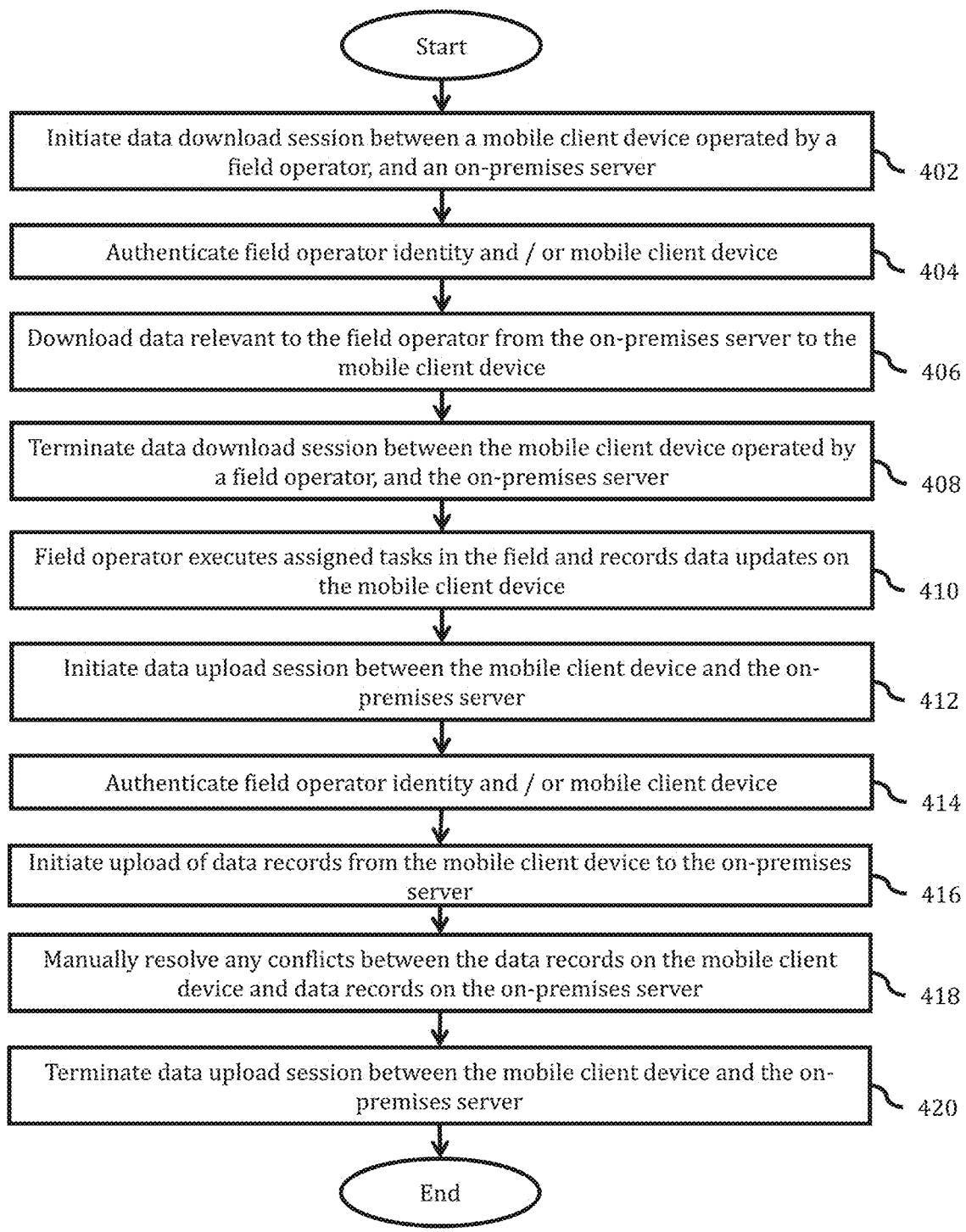
FIG. 4 is a flowchart illustrating conventional method steps involved in data synchronization between a mobile client device and an on-premises server within an industrial plant environment.
Figure 5:
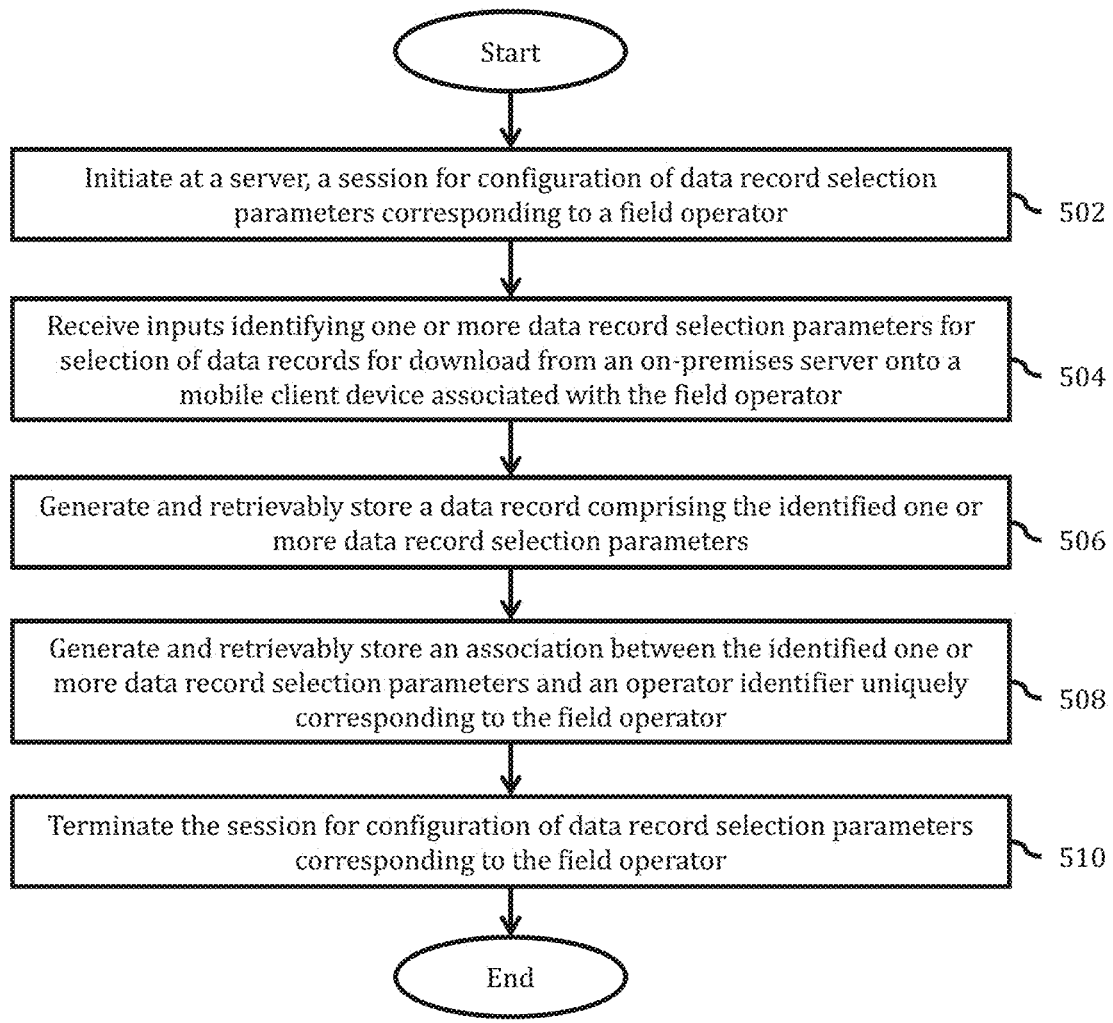
FIG. 5 is a flowchart illustrating method steps involved in configuring a set of data record selection parameters for identifying a sub-set of a larger set of data records that are associated with a field operator, for subsequent download into a mobile client device assigned to the field operator.

FIG. 5 is a flowchart illustrating method steps involved in configuring, within an on-premises server, a set of data record selection parameters for identifying a sub-set of a larger set of data records that are associated with a field operator, for subsequent download into a mobile client device assigned to the field operator.

Step 502 comprises initiating at a server (for example, at on-premises server 302), a session for configuration of data record selection parameters corresponding to a field operator. The session may be initiated by the field operator or by a console operator through a client terminal or a web-client interface communicatively coupled with the on-premises server 302.

Step 504 comprises receiving (from the field operator or console operator) inputs identifying one or more data record selection parameters for selection of data records for download from an on-premises server 302 into a mobile client device 304 (304a to 304n) associated with the field operator. The data record selection parameters may comprise any one or more data record attributes or properties assigned to/associated with one or more data records associated with said field operator—including but without limitation, time of creation, time to start work and/or time to end work, shift time, status of task, status of the data record etc.

Step 506 comprises generating and retrievably storing a data record comprising the one or more data record selection parameters that have been defined at step 504. Step 508 comprises generating and retrievably storing an association between the identified one or more data record selection parameters and an operator identifier uniquely corresponding to the field operator. Step 508 serves to link or associate the identified one or more data record selection parameters with a particular field operator through the unique operator identifier, and as a result, the one or more data record selection parameters associated with an operator can be subsequently retrieved based on the unique operator identifier that has been associated with these data records.

Thereafter, step 510 comprises terminating the session for configuration of data record selection parameters that is associated with the field operator.

As discussed in more detail subsequently, the one or more data record selection parameters generated and stored according to the method of FIG. 5 may be used to selectively download a sub-set of data records associated with a field operator into the field operator's mobile device during a subsequent data synchronization session between the on-premises server 302 and a mobile client device 304 (304a to 304n).

In another embodiment, the invention enables reduction of the number of data records that are required to be downloaded into a field operator's mobile client device during data synchronization, by enabling configuration of one or more version synchronization rules. The invention enables this by enabling a field operator (or a console operator) to define one or more version synchronization rules—which enable data record version based selection of data records from among the entire set of data record associated with said field operator—such that only those data records that satisfy the one or more version synchronization rules are downloaded into a mobile client device associated with the field operator during a data synchronization session.

Figure 6:
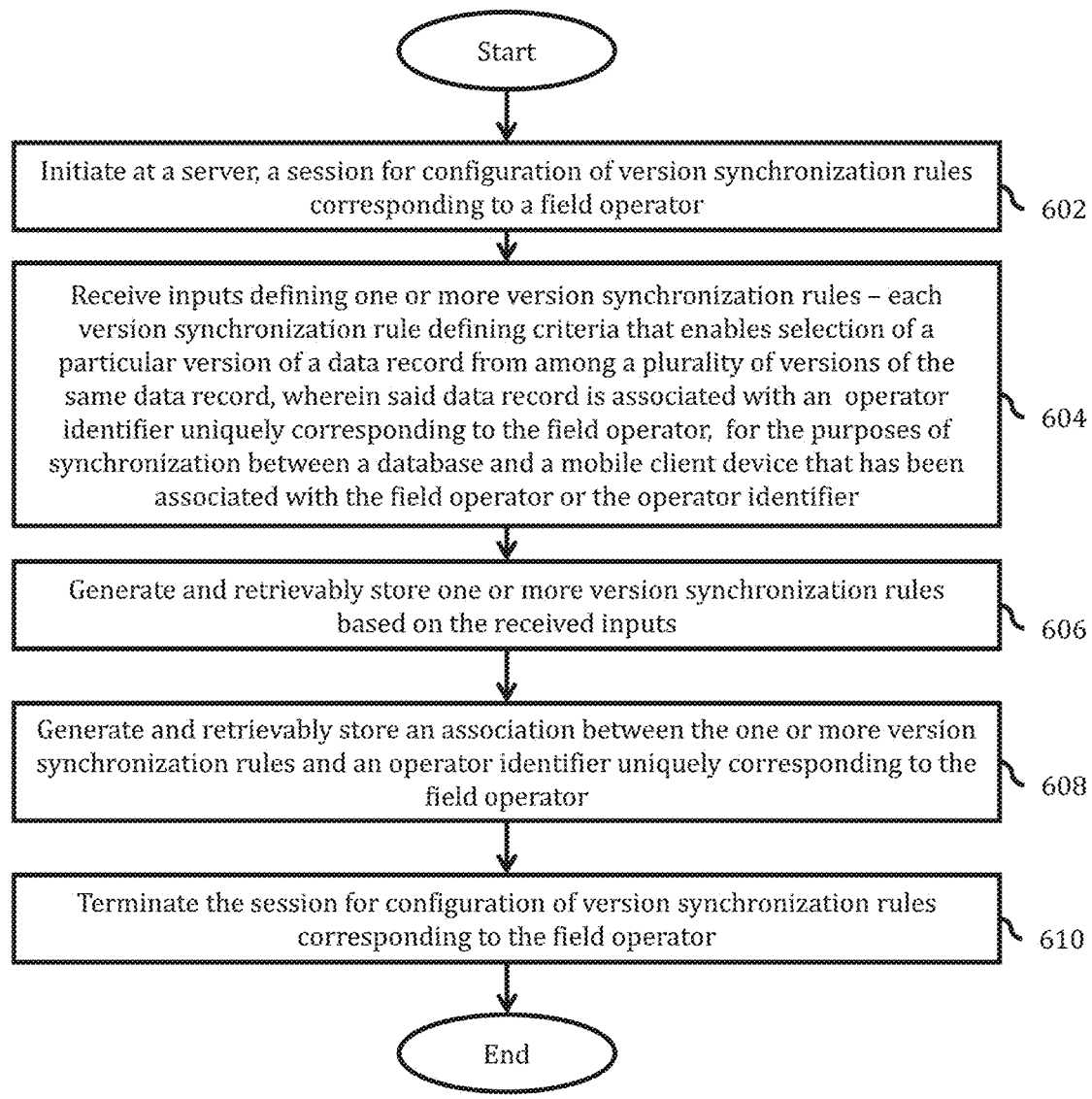
FIG. 6 is a flowchart illustrating method steps involved in configuring version synchronization rules for identifying a sub-set of a larger set of data records that are associated with a field operator, for subsequent download into a mobile client device assigned to the field operator.

FIG. 6 is a flowchart illustrating method steps involved in configuring within an on-premises server version synchronization rules for identifying a sub-set of a larger set of data records that are associated with a field operator, for subsequent download into a mobile client device assigned to the field operator.

Step 602 comprises initiating at a server (for example, at on-premises server 302), initiate at a server, a session for configuration of version synchronization rules corresponding to a field operator. The session may be initiated by the field operator or by a console operator through a client terminal or a web-client interface communicatively coupled with the on-premises server 302.

Step 604 comprises receiving (from the field operator or console operator) inputs defining one or more version synchronization rules—wherein each version synchronization rule defines criteria that enables the selection of a particular version of a data record from among a plurality of versions of the same data record associated with an operator identifier uniquely corresponding to the field operator, for the purposes of synchronization between a database/server and a mobile client device that has been associated with the field operator or the operator identifier. A version synchronization rule may define any identification or selection criteria or method for identifying a particular version of a data record from a plurality of versions of said data record—including without limitation, selection based on time of creation, selection of the version having the most recent version number, selection based on identity of the operator who has created the version, selection based on whether a version has been reviewed and approved by a shift supervisor etc.

Step 606 comprises generating and retrievably storing a data record comprising the one or more version synchronization rules that have been defined at step 604. Step 608 comprises generating and retrievably storing an association between the defined one or more version synchronization rules and an operator identifier uniquely corresponding to the field operator. Step 608 serves to link the the one or more version synchronization rules with a particular field operator through the unique operator identifier, and as a result, the one or more version synchronization rules associated with an operator can be subsequently retrieved based on the unique operator identifier that has been associated with these data records.

Thereafter step 610 comprises terminating the session for configuration of version synchronization rules corresponding to the field operator.

The invention additionally provides methods for applying one or more data record selection parameters (defined in accordance with the method of FIG. 5) and/or one or more version synchronization rules (that have been defined in accordance with the method of FIG. 6) for enabling reduction of the total number of data records that are required to be downloaded to a mobile client device during a data synchronization session between a field operator's mobile client device and the on-premises server.

Figure 7A:
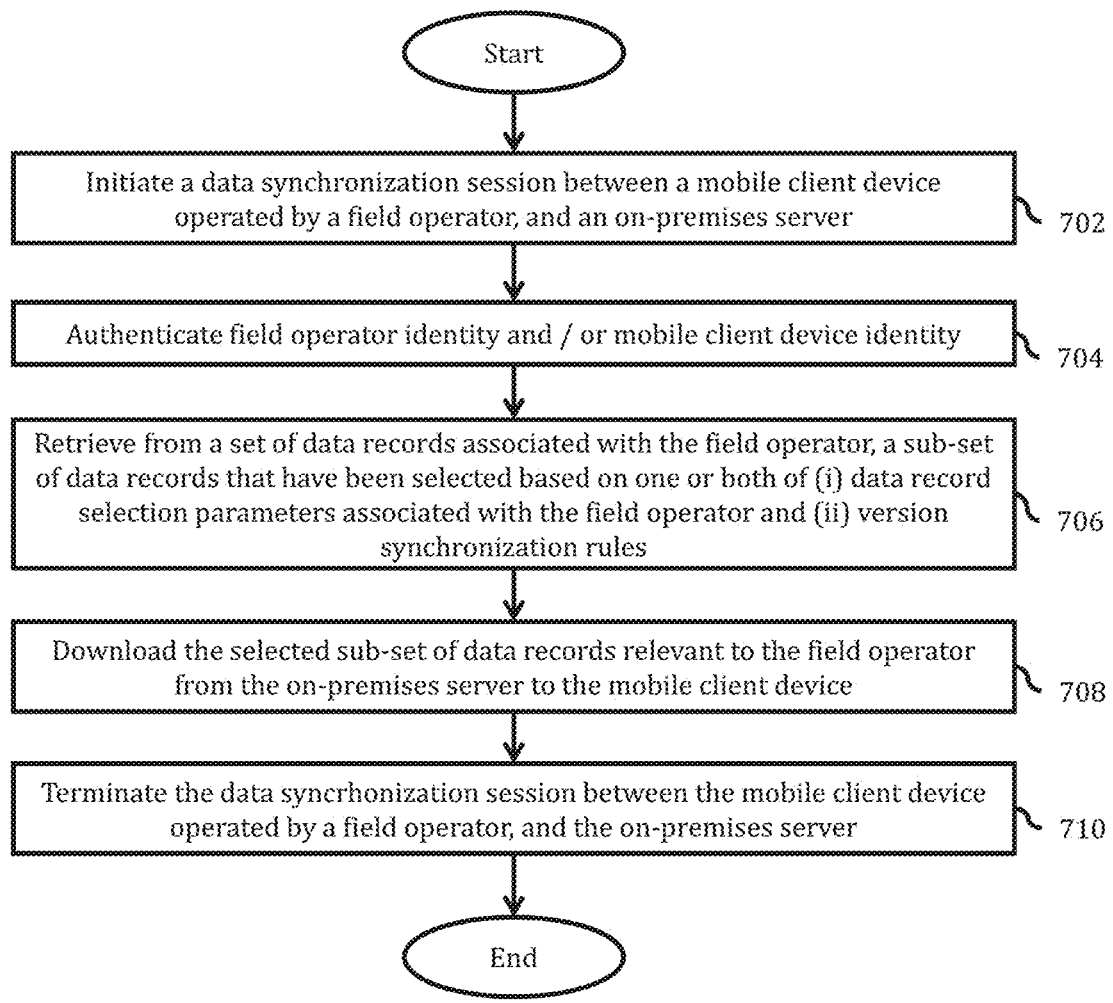
FIG. 7A is a flowchart illustrating method steps involved in data synchronization between an on-premises server and a mobile client device for downloading data records from the on-premises server into the mobile client device.

FIG. 7A is a flowchart illustrating method steps involved in data synchronization between an on-premises server and a mobile client device for downloading data records from the on-premises server into the mobile client device, wherein one or more data record selection parameters and/or one or more version synchronization rules are applied for enabling reduction of the total number of data records that are required to be downloaded to the mobile client device during the data synchronization session.

Step 702 comprises initiate a data synchronization session (comprising at least a data download session) between a mobile client device operated by a field operator (for example, a mobile client device 304), and an on-premises server (for example, on premises server 302). Step 704 comprises authenticating a field operator identity and/or authenticating a mobile client device associated with the initiated data download session. The authentication may comprise any authentication mechanism including one that relies on one or more of static or dynamic password based, biometric based, hardware token based, or software or electronic token based authentication of the field operator identity or of the mobile client device. The objective of the authentication step is to ensure that the access to the on-premises server is limited to field operators and/or mobile client devices that have been appropriately authorized for such access.

Step 706 comprises retrieving from a set of data records associated with the field operator a sub-set of data records that have been selected based on any one or both of (i) one or more data record selection parameters associated with said field operator (for example data record selection parameters defined in accordance with the method of FIG. 5) and (ii) one or more version synchronization rules (for example version synchronization rules defined in accordance with the method of FIG. 6). The set of data records associated with the field operator may be identified based on a unique operator identifier or mobile client device identifier or other identifier stored within each data record therewithin and that represents an association between the data record and the field operator or the mobile client device assigned to or operated by the field operator.

Step 708 comprises downloading the selected sub-set of data records relevant to the field operator from the on-premises server to the mobile client device. Thereafter step 710 comprises termination of the data download session between the mobile client device and the on-premises server.

Figure 7B:
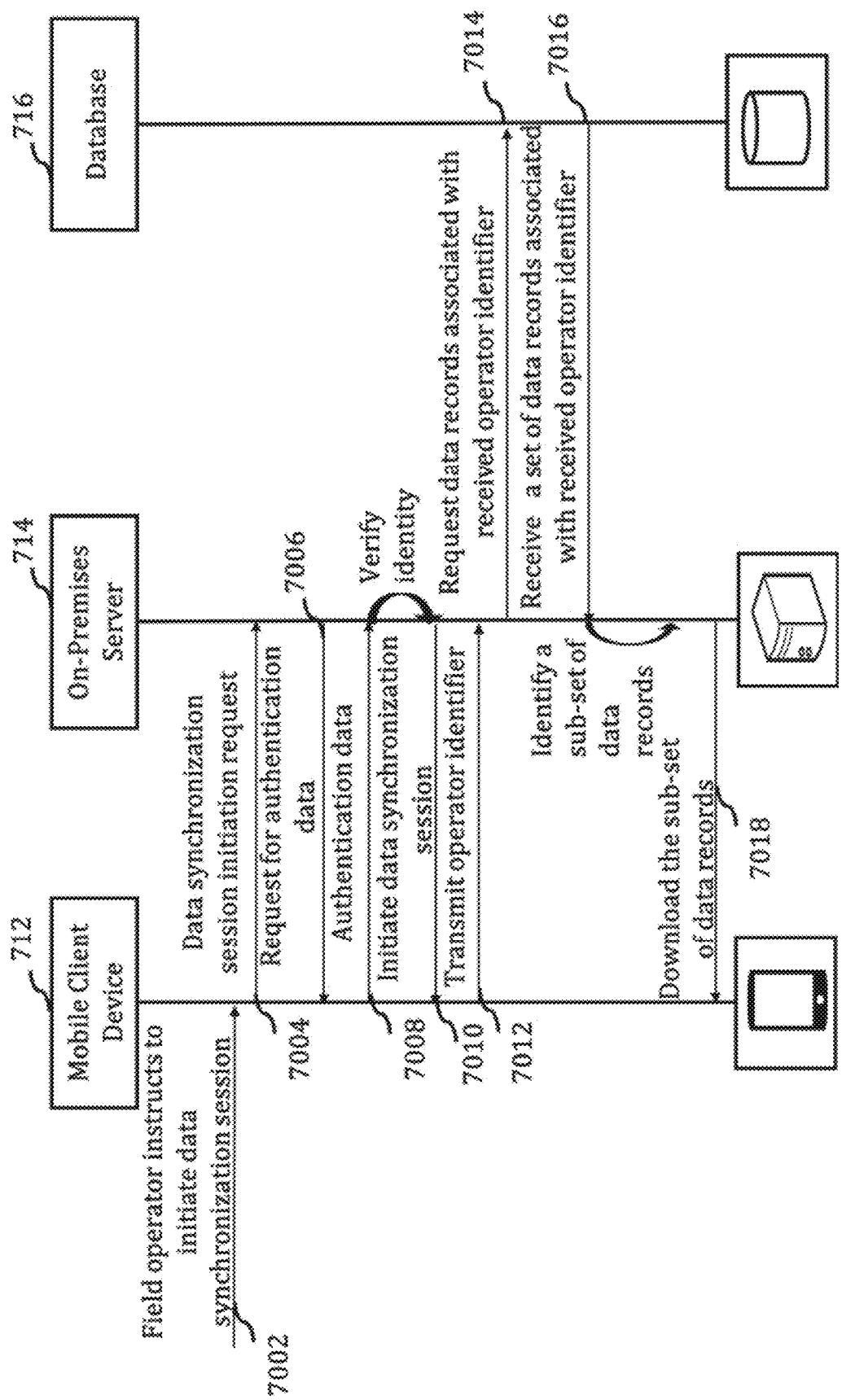
FIG. 7B is a communication flow diagram illustrating communication flow between entities for the purposes of data synchronization between an on-premises server and a mobile client device for downloading data records from the on-premises server into the mobile client device.

FIG. 7B is a communication flow diagram illustrating communication flow between different entities for the purposes of data synchronization between an on-premises server and a mobile client device for downloading data records from the on-premises server into the mobile client device. The communication flow diagram illustrates the communication flow between the different entities for implementing the method described above in connection with FIG. 7A.

Step 7002 comprises receiving at a mobile client device 712, field operator instructions to initiate a data synchronization session (comprising at least a data download session) with an on-premises server 714. Step 7004 comprises transmitting from mobile client device 712 to on-premises server 714 a data download session initiation request. At step 7006, on-premises server 714 transmits back to mobile client device 712 a request for authentication data to enable authentication of the identity of the field operator or the mobile client device 712. Step 7008 comprises transmitting from mobile client device 712 to on-premises server 714 the requested authentication data (for example, one or more of a static or dynamic password, biometric data, hardware token data, software token data or electronic token data). On premises server 714 uses the received authentication data to verify the identity of the field operator or mobile client device 712 that has requested initiation of the data synchronization session (or data download session), and subject to authentication of said identity, at step 7010 initiates the data synchronization session (or data download session) with mobile client device 712.

Step 7012 comprises transmitting an operator identifier (that identifies the field operator associated with the mobile client device 712) from mobile client device 712 to on-premises server 714.

At step 7014, on-premises server 714 transmits to a database 716 that is communicably coupled with on-premises server 714, a request for data records associated with the operator identifier received at step 7012. The database identifies a set of data records associated with the operator identifier, and at step 7016 transmits said set of data records back to on-premises server 714. The on-premises server 714 identifies within the received set of data records, a sub-set of data records based on one or both of (i) one or more data record selection parameters associated with the field operator (for example data record selection parameters defined in accordance with the method of FIG. 5) and (ii) one or more version synchronization rules (for example version synchronization rules defined in accordance with the method of FIG. 6). Thereafter, step 7018 comprises downloading the identified sub-set of data records from the on-premises server 714 into mobile client device 712.

Figure 8:
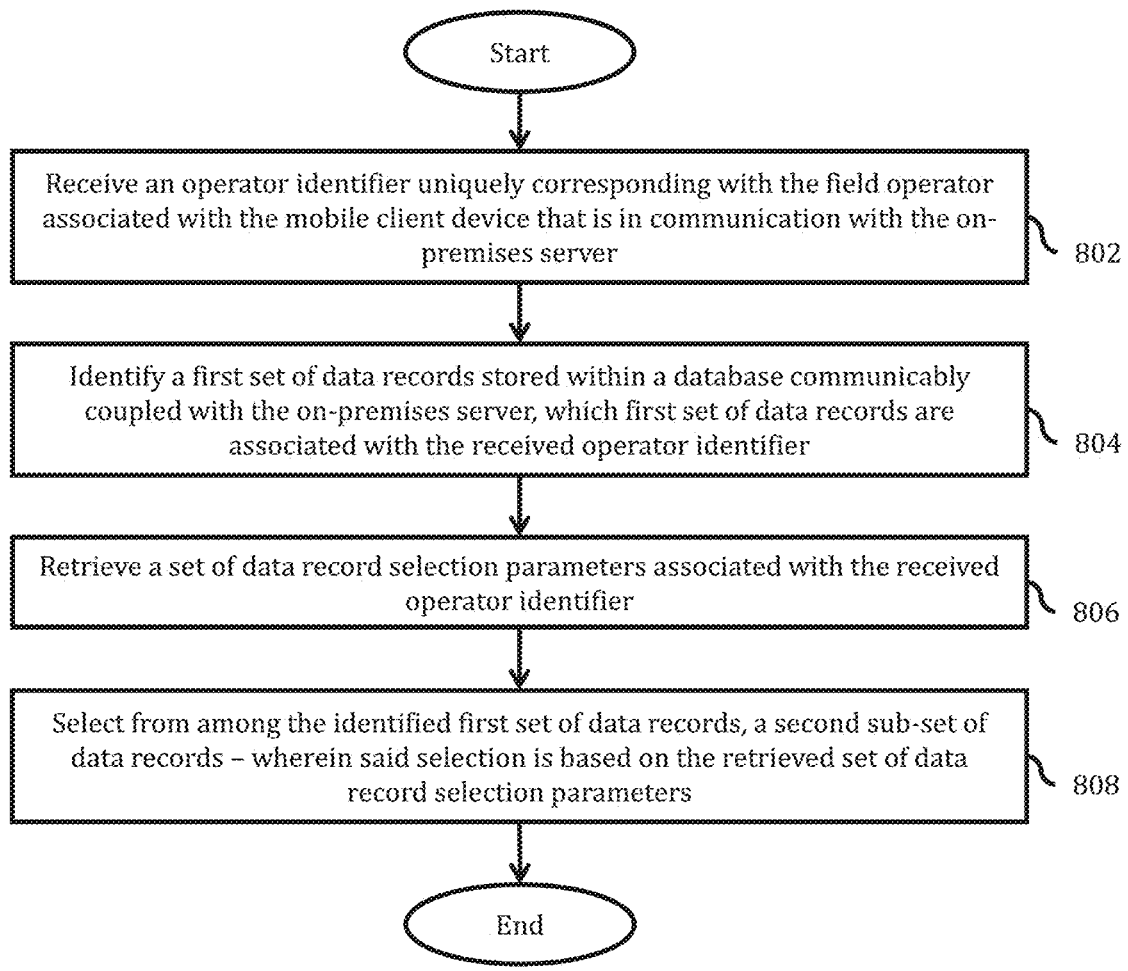
FIG. 8 is a flowchart illustrating method steps involved in data record selection parameter based identification of a sub-set of data records associated with a field operator, for enabling data synchronization between an on-premises server and a mobile client device when downloading data records from the on-premises server into the mobile client device.

FIG. 8 is a flowchart illustrating method steps involved in data record selection parameter based identification of a sub-set of data records associated with a field operator, for enabling data synchronization between an on-premises server and a mobile client device when downloading data records from the on-premises server into the mobile client device. In an embodiment, the method of FIG. 8 may be implemented for the purposes of implementing step 706 of the method of FIG. 7A. In an embodiment, the method of FIG. 8 may be implemented at on-premises server 302.

Step 802 of FIG. 8 comprises receiving an operator identifier uniquely corresponding with the field operator associated with the mobile client device (for example mobile client device 304) that is in communication with the on-premises server (for example, on-premises server 302). The operator identifier may be received at the on-premises server 302 from the mobile client device 304.

Step 804 comprises identifying a first set of data records stored within a database communicably coupled with the on-premises server 302, wherein the identified first set of data records are associated with the received operator identifier. Stated differently, the first set of data records comprises one or more data records associated with the field operator with whom the received operator identifier is associated.

Step 806 comprises retrieving a set of data record selection parameters associated with the received operator identifier (or with the corresponding field operator with whom the received operator identifier is associated). The set of data record selection parameters comprises one or more data record selection parameters that have been generated and associated with the field operator in accordance with the method of FIG. 5.

Step 808 thereafter comprises selecting from among the identified first set of data records, a second sub-set of data records—wherein said selection of the second sub-set of data records is based on the retrieved set of data record selection parameters (retrieved at step 806). Selection of the second sub-set of data records may in an embodiment comprises selecting one or more data records within the first set of data records, which have data record parameters that match or satisfy one or more data record selection parameters within the retrieved set of data record selection parameters associated with the received operator identifier.

Figure 9:
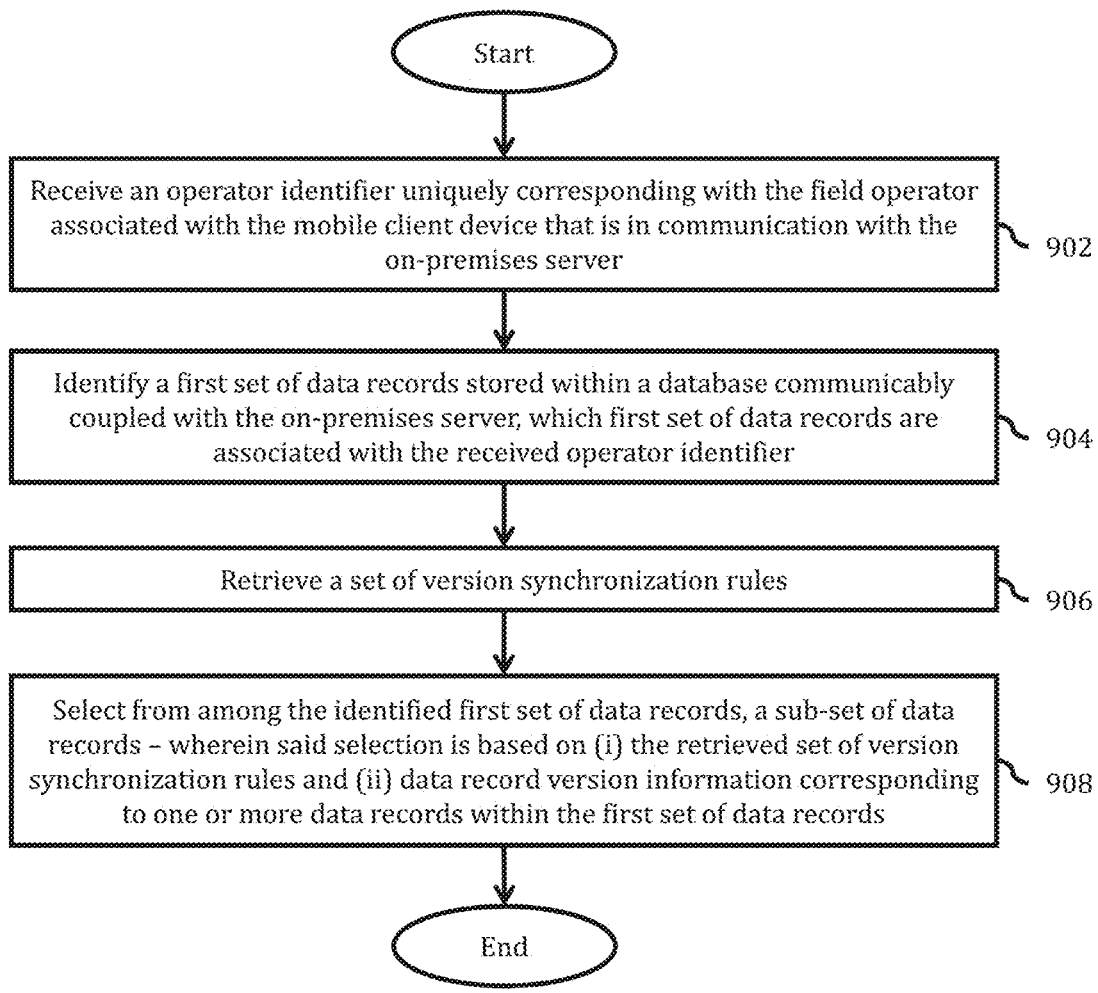
FIG. 9 is a flowchart illustrating method steps involved in version synchronization rule based identification of a sub-set of data records associated with a field operator, for enabling data synchronization between an on-premises server and a mobile client device when downloading data records from the on-premises server into the mobile client device.

FIG. 9 is a flowchart illustrating method steps involved in version synchronization rule based identification of a sub-set of data records associated with a field operator, for enabling data synchronization between an on-premises server and a mobile client device when downloading data records from the on-premises server into the mobile client device. In an embodiment, the method of FIG. 9 may be implemented for the purposes of implementing step 706 of the method of FIG. 7A. In an embodiment, the method of FIG. 9 may be implemented at on-premises server 302.

Step 902 of FIG. 9 comprises receiving an operator identifier uniquely corresponding with the field operator associated with the mobile client device (for example mobile client device 304) that is in communication with the on-premises server (for example, on-premises server 302). The operator identifier may be received at the on-premises server 302 from the mobile client device 304.

Step 904 comprises identifying a first set of data records stored within a database communicably coupled with the on-premises server 302, wherein the identified first set of data records are associated with the received operator identifier. Stated differently, the first set of data records comprises one or more data records associated with the field operator with whom the received operator identifier is associated. In an embodiment, the first set of data records identified at step 904 is the second sub-set of data records that has been selected at step 808 of the method of FIG. 8.

Step 906 comprises retrieving a set of version synchronization rules associated with the received operator identifier (or with the corresponding field operator with whom the received operator identifier is associated). The set of version synchronization rules comprises one or more version synchronization rules that have been generated and associated with the field operator in accordance with the method of FIG. 6.

Step 908 thereafter comprises selecting from among the identified first set of data records, a sub-set of data records— wherein said selection of the sub-set of data records is based on (i) the retrieved set of version synchronization rules and (ii) data record version information corresponding to one or more data records within the first set of data records. In an embodiment where the first set of data records identified at step 904 is the second sub-set of data records that has been selected at step 808 of the method of FIG. 8, and the sub-set of data records selected at step 908 may therefore be considered or referred to as a "third sub-set" of data records that are selected out of the second sub-set of data records that has been selected at step 808. Selection of this sub-set of data records at step 908 may in an embodiment comprise at least one of (i) selecting one or more data records from within the first set of data record identified at step 904, that have only a single data record version stored within the database and (ii) selecting a specific version of a data record that has multiple versions within the first set of data records identified at step 904, wherein the selected specific version of the data record has version attributes or version parameters that match or satisfy one or more version synchronization rules within the retrieved set of version synchronization rules associated with the received operator identifier. In an embodiment, the selection of a specific version of the data record from among multiple versions of the same data record within the first set of data records is additionally based on, but not limited to, identifying whether a version of the same data record is available on the mobile client device, and ensuring that the version of the data record selected from within the first set of data records is a version that has a more recent version number, or a more recent time of creation, when compared with the other versions available on the mobile client device. In another embodiment, the selection of a specific version of the data record from among multiple versions of the same data record within the first set of data records is based on a priority assigned to the creator of the specific version of the data record in comparison with priorities assigned to one or more creators of other versions of the same data record within the first set of data records— wherein said priorities are assigned by one or more version synchronization rules. In this embodiment, selection of a specific version of the data record over other versions of the data record that are available within the first set of data records may be based on one or more version synchronization rules that assign a higher priority to the specific version of the data record based on the identity of its creator, when compared with priorities assigned to the remaining versions of said data record based on the identities of their respective creators. For instance, one version synchronization rule may be defined to assign higher priority to a version of one data record created by a field operator supervisor, when comparing with another version with respect to the same data record created by a field operator.

FIG. 10 is a flowchart illustrating method steps involved in identification of a sub-set of data records associated with a field operator, for enabling data synchronization between an on-premises server and a mobile client device when downloading data records from the on-premises server into the mobile client device—and wherein the identification is based on data record selection parameters and version synchronization rules. In an embodiment, the method of FIG. 10 combines the methods of both of FIGS. 8 and 9. In an embodiment, the method of FIG. 10 may be implemented for the purposes of implementing step 706 of the method of FIG. 7A. In an embodiment, the method of FIG. 10 may be implemented at on-premises server 302.

Step 1002 of FIG. 10 comprises receiving an operator identifier uniquely corresponding with the field operator associated with the mobile client device (for example mobile client device 304) that is in communication with the on-premises server (for example, on-premises server 302). The operator identifier may be received at the on-premises server 302 from the mobile client device 304.

Step 1004 comprises optionally receiving data record version information corresponding to one or more data records stored on the mobile client device 304 that is communicably coupled with the on-premises server 302 and that is operated by the field operator.

Step 1006 comprises identifying a set of data records stored within a database communicably coupled with the on-premises server 302, wherein the identified set of data records are associated with the received operator identifier. Stated differently, the set of data records comprises one or more data records associated with the field operator with whom the received operator identifier is associated.

Step 1008 comprises retrieving a set of version synchronization rules associated with the received operator identifier (or with the corresponding field operator with whom the received operator identifier is associated). The set of version synchronization rules comprises one or more version synchronization rules that have been generated and associated with the field operator in accordance with the method of FIG. 6.

Step 1010 comprises selecting from among the identified set of data records, a sub-set of data records—wherein said selection is based on (i) the retrieved set of version synchronization rules (ii) data record version information corresponding to one or more data records within the first set of data records, and (iii) the data record version information corresponding to one or more data records stored on the mobile client device that is communicably coupled with the on-premises server and that is operated by the field operator.

In an embodiment of the method of FIG. 10, the selection of the sub-set of data records from the identified set of data records (i.e. a first set of data records) may comprise (i) identifying a second sub-set of data records from said first set of data records based on a retrieved set of data record selection parameters associated with the received operator identifier (i.e. identifying the second sub-set of data records based on the teachings of steps 806 and 808 of the method of FIG. 8, and (ii) identifying from among the second sub-set of data records, a third sub-set of data records, which identification of the third sub-set of data records is based on (i) the retrieved set of version synchronization rules (ii) data record version information corresponding to one or more data records within the second sub-set of data records, and (iii) the data record version information corresponding to one or more data records stored on the mobile client device that is communicably coupled with the on-premises server and that is operated by the field operator. The identified third sub-set of data records is thereafter treated as the sub-set of data records selected at step 1010 from among the identified set of data records.

As discussed previously, selection of the sub-set of data records (i.e. the third sub-set of data records) at step 1010 may in an embodiment comprise at least one of (i) selecting one or more data records from within the second sub-set of data, that have only a single data record version stored within the database and (ii) selecting a specific version of a data record that has multiple versions within the set of data records (identified at step 1006) or within the second sub-set of data records, wherein the selected specific version of the data record has version attributes or version parameters that match or satisfy the requirements of one or more version synchronization rules within the retrieved set of version synchronization rules associated with the received operator identifier.

In an embodiment, the selection of a specific version of the data record from among multiple versions of the same data record within the set of data records (identified at step 1006) or within the second sub-set of data records is additionally based on identifying whether a version of the same data record is available on the mobile client device, and ensuring that the version of the data record selected from within the first set of data records is a version that has a more recent version number, or a more recent time of creation, when compared with the other versions available on the mobile client device. In the embodiment of FIG. 10, the selection of a specific version of the data record from among multiple versions of the same data record within the set of data records (identified at step 1006) or within the second sub-set of data records is based on parsing data record version information corresponding to one or more data records stored on the mobile client device, and identifying a priority assigned to the creator of the specific version of the data record in comparison with priorities assigned to one or more creators of other versions of the same data record within the first set of data records—wherein said priorities are assigned by one or more of the version synchronization rules.

In this embodiment, selection of a specific version of the data record over other versions of the data record that are available within the set of data records (identified at step 1006) or within the second sub-set of data records is based on one or more version synchronization rules that assign a higher priority to the specific version of the data record based on the identity of its creator, when compared with priorities assigned to the remaining versions of said data record based on the identities of their respective creators.

So for example, a specific version of a data record may only be selected from among the set of data records (identified at step 1006) or within the second sub-set of data records, if the priority assigned to the creator of that version is higher than a priority assigned to another creator of another version of the same data record available on the mobile client device—and in which case the specific version of the data record assigned with a higher priority will be used during the synchronization process to overwrite or substitute the version of the same data record assigned with lower priority that is available on the mobile client device.

In another example, one or more versions of a data record available within the set of data records (identified at step 1006) or within the second sub-set of data records will not be selected for download into the mobile client device, if the priority assigned to the respective creators of such one or more versions is lower than a priority assigned to the creator of the other version of the same data record available on the mobile client device—and in which case the version of the data record already available on the mobile client device will be retained on the mobile client device, and optionally the version of the data record already available on the mobile client device may be copied during a data synchronization process with the database communicably coupled with the on-premises server 302.

FIG. 11 is a communication flow diagram illustrating communication flow between entities for the purposes of data synchronization between an on-premises server and a mobile client device for downloading data records from the on-premises server into the mobile client device, wherein the data synchronization is based on version information corresponding to data records already available in the mobile client device. The communication flow diagram illustrates the communication flow between entities for implementing the method described above in connection with FIG. 10.

Step 11002 comprises implementing an initial data synchronization session between on-premises server 1112 and mobile client device 1110—for downloading of data records associated with an identified field operator (i.e. a field operator associated with mobile client device 1110) from on-premises server 1112 to mobile client device 1110. In the course of execution of tasks by the field operator (for example, during the field operator's shift), the field operator may provide additional inputs or additional data through mobile client device 1110, which results in modification of the downloaded data records and/or modification of version information corresponding to the downloaded data records.

Simultaneously, at step 11004, additional client device 1116 implements at database 1114 (which is communicably coupled with on-premises server 1112) modifications to one or more data records associated with the field operator and/or version information corresponding to such one or more data records. The additional client device 1116 is operated by an operator other than the field operator (for example another field operator having access or authorization to modify one or more of the data records that have been downloaded). The data records modified by the additional client device 1116 includes copies of the one or more data records that have also been downloaded into mobile client device 1110 and which have been modified at mobile client device 1110 based on inputs received from the field operator who is operating mobile client device 1110. As a result of the simultaneous modification of copies of the same one or more data records at both of the mobile client device 1110 and the additional client device 1116, mobile client device 1110 will have stored thereon, a first set of versions of one or more data records while database 1114 will have stored thereon a second set of versions of said one or more data records, wherein the first set of versions of one or more data records and the second set of versions of said one or more data records are different.

Step 11006 comprises initiating a second data synchronization session 11006 for further data synchronization between mobile client device 1110 and on-premises server 1112.

At step 11008, on-premises server 1112 requests from database 1114, data records that are associated with a received operator identifier that uniquely identifies a field operator who is operating the mobile client device 1110. At step 11010, responsive to said request, database 1114 identifies and communicates to on-premises server 1112, information identifying or corresponding to a set of data records that are stored within said database 1114 and that are associated with the received operator identifier that uniquely identifies the field operator who is operating the mobile client device 1110.

At step 11012 on-premises server 1112 transmits to mobile client device 1110, version information (for example version numbers or version generation time stamps or version modification time stamps) associated with data records within the set of data records that have been identified at step 11010.

Based on the version information received from on-premises server 1112, mobile client device 1110 identifies a sub-set of data records (comprising one or more data records from among the set of data records identified at step 11010) that require to be additionally downloaded from on-premises server 1112 into mobile client device 1110.

Identification of the sub-set of data records may be based on (i) a set of version synchronization rules, (ii) data record version information received at step 11012, and (iii) optionally based on identifying whether a version of a data record within the set of data records identified at step 11010 is available on the mobile client device, and whether the version of the data record selected from within the set of data records identified at step 11010 is a version that has a more recent version number, or a more recent time of creation, when compared with the other versions available on mobile client device 1110 and (iv) optionally based on identifying whether a specific version of the data record from among multiple versions of the same data record within the set of data records identified at step 11010 that has been generated or modified by a user having an assigned priority that is higher than the priority assigned to the field operator who is operating mobile client device 1110. In an embodiment, the identification of the sub-set of data records by mobile client device 1110 may include any one or more of the steps/embodiments that have been described above in connection with step 1010 of FIG. 10.

Step 11014 thereafter comprises transmitting to on-premises server 1112, a request for downloading the identified sub-set of data records from on-premises server into mobile client device 1110. On-premises server 1112 may obtain the identified sub-set of data records from database 1114, and at step 11016 transmits the requested sub-set of data records to mobile client device 1110 for the purposes of data synchronization.

While the communication flow of FIG. 11 shows implementation of the step of identifying the sub-set of data records at mobile client device 1110, it would be understood that this step can equally be implemented at on-premises server 1112, and that once identified, the sub-set of data records can be retrieved from database 1114 and transmitted onward to mobile client device 1110.

It will also be understood that during any data synchronization session between a mobile client device and an on-premises server, one or more or all data records that have been generated or modified on the mobile client device subsequent to an earlier data synchronization session with the on-premises server, can be uploaded onto the on-premises server and retrievably stored within a database associated or coupled with the on-premises server.

In addition to the above, the invention provides methods and systems for a data optimized and efficient solution for resuming and completing a data synchronization session that has been previously interrupted, paused or unintentionally terminated—so as to avoid having to re-initiate the entire data download when the data synchronization session resumes or is restarted.

FIG. 12 is a flowchart illustrating method steps involved in data synchronization between an on-premises server and a mobile client device when downloading data records from the on-premises server into the mobile client device, for implementation in response to interruption of the data synchronization session.

Step 1202 comprises initiating a data download session between a mobile client device operated by a field operator, and an on-premises server. Step 1204 commences downloading of a selected set of data records relevant to or associated with a field operator (the field operator who is using or operating the mobile client device) from the on-premises server into the mobile client device. In an embodiment, for the duration of the download session/data synchronization session, either or both of the on-premises server and/or mobile client device monitors or tracks data records within the selected set of data records that have been fully downloaded or completely downloaded onto the mobile device, and data records within the selected set of data records that remain to be downloaded or partially downloaded onto the mobile device.

Responsive to interruption (by way of either temporary interruption or termination) of the data download session between the mobile client device and the on-premises server, step 1206 comprises identifying a sub-set of the selected set of data records that have not been fully transmitted to or downloaded into the mobile client device within the data download session.

At step 1208, responsive to resuming (or re-starting or re-initiation) of a data download session between the mobile client device and the on-premises server, the sub-set of data records that has been identified at step 1206 is transmitted to the mobile client device without retransmitting data records within the set of data records that have already been fully transmitted to the mobile client device prior to interruption of the data download session.

FIG. 13 is a communication flow diagram illustrating communication flow between system entities, for the purposes of data synchronization between an on-premises server and a mobile client device when downloading data records from the on-premises server into the mobile client device, for implementation in response to interruption of the data synchronization session. In an embodiment, the communication flow of FIG. 13 may be implemented in connection with the method of FIG. 12.

Step 13002 comprises receiving at mobile client device 1312, field operator instructions to initiate a data download session with on-premises server 1314. Step 13004 comprises initiating a data download session between mobile client device 1312 and on-premises server 1314.

At step 13006, on-premises server 1314 retrieves from database 1316, a selected set of data records that are relevant to or associated with the field operator who is using or operating mobile client device 1312. Step 13008 thereafter comprises commencing transmission of the set of data records from on-premises server 1314 to mobile client device 1312.

On-premises server 1314 thereafter detects a session interruption event—comprising pausing, interruption or termination of the ongoing data record download session. Responsive to detection of a session interruption event, on-premises server 1314 identifies a sub-set of data records (from among the set of data records being transmitted to mobile client device 1312) that have not been fully or completely transmitted to mobile client device 1312.

Subsequently, on-premises server 1314 detects a session resume event—comprising resuming, restarting or re-initiation of a data record download session between on-premises server 1314 and mobile client device 1312. Responsive to detection of the session resume event, on-premises server commences and implements at step 13010 transmission of the identified sub-set of data records—and in a preferred embodiment, the identified sub-set of data records are transmitted to mobile client device 1312 without retransmitting data records within the set of data records that have already been fully transmitted to the mobile client device prior to the detection of the session interruption event.

The invention further provides methods and interfaces for enabling field operator based resolution of data record version conflicts between data record versions stored on a mobile client device and data record versions stored within a database coupled with an on-premises server. FIG. 14 is a flowchart illustrating a method of enabling field operator based resolution of data record version conflicts through a mobile client device interface. The method of FIG. 14 may be implemented partially or entirely within a mobile client device.

At step 1402, a field operator (who is operating or using a mobile client device) executes assigned tasks in the field and records data updates on the mobile client device. Step 1404 comprises initiating a data synchronization session/ data upload session between the mobile client device and the on-premises server.

Step 1406 comprises, detecting any differences in version information relating to data records stored on the mobile client device when compared against version information relating to the same data records stored on a database coupled with the on-premises server. In one embodiment, step 1406 may be implemented within the mobile client device. In an alternate embodiment, step 1406 may be implemented within the on-premises server.

Step 1408 comprises displaying to the field operator, through a user interface implemented on the mobile client device, information identifying the detected differences in version information.

Thereafter, step 1410 comprises receiving through the user interface, field operator inputs representing the field operator's instructions on resolving any detected version conflict between data records stored on the mobile client device and the corresponding data records stored on the database coupled with the on-premises server. These field operator inputs may thereafter be used to either retain one or more of the data record versions that are available on the mobile client device (and optionally simultaneously update the database of the on-premises servers with said one or more data record versions that are available on the mobile client device) or alternatively to substitute one or more of the data record versions that are available on the mobile client device with alternate version(s) of the same data record(s) that have been retrieved from a database coupled with the on-premises server.

Figure 15:
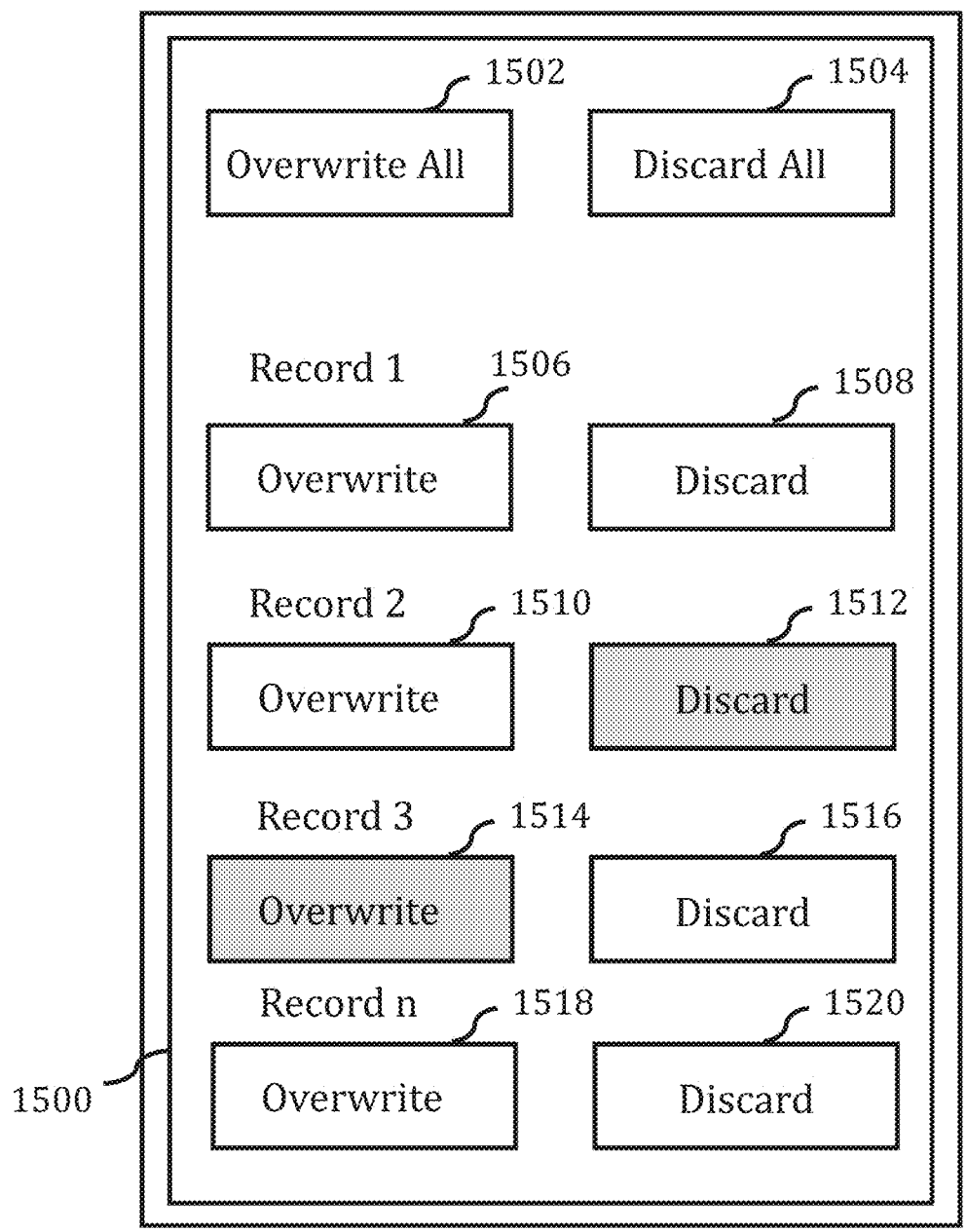

FIG. 15 illustrates an exemplary operator interface 1500 of a kind that may be implemented within and presented at a mobile client device at step 1410 of FIG. 14, to receive field operator inputs representing the field operator's instructions on resolving any detected version conflict between data records stored on the mobile client device and corresponding data records stored on the database coupled with the on-premises server. As shown in FIG. 15, operator interface 1500 presents a field operator with various selectable options including (i) a button 1502 that allows the field operator to overwrite all data record versions stored within a database coupled with an on-premises server and that are in conflict with or different from data record versions of the same data records that are stored on the mobile client device, with the data record versions of said same data records that are stored on the mobile client device, (ii) a button 1504 that allows the field operator to discard all data record versions stored within the mobile client device that are determined to be in conflict with or different from data record versions of the same data records that are stored in a database coupled with an on-premises server, (iii) a button 1506 that allows the field operator to overwrite a data record version of 'Record 1' that is stored within a database coupled with an on-premises server and that is in conflict with or different from a data record version of 'Record 1' that is stored on the mobile client device, with the data record version of 'Record 1' that is stored on the mobile client device, (iv) a button 1508 that allows the field operator to discard the data record version of 'Record 1' that is stored within the mobile client device and that has been determined to be in conflict with or different from the data record version of 'Record 1' that is stored in a database coupled with an on-premises server, (v) a button 1510 that allows the field operator to overwrite a data record version of 'Record 2' that is stored within a database coupled with an on-premises server and that is in conflict with or different from a data record version of 'Record 2' that is stored on the mobile client device, with the data record version of 'Record 2' that is stored on the mobile client device, (vi) a button 1512 that allows the field operator to discard the data record version of 'Record 2' that is stored within the mobile client device and that has been determined to be in conflict with or different from the data record version of 'Record 2' that is stored in a database coupled with an on-premises server, (vii) a button 1514 that allows the field operator to overwrite a data record version of 'Record 3' that is stored within a database coupled with an on-premises server and that is in conflict with or different from a data record version of 'Record 3' that is stored on the mobile client device, with the data record version of 'Record 3' that is stored on the mobile client device, (viii) a button 1516 that allows the field operator to discard the data record version of 'Record 3' that is stored within the mobile client device and that has been determined to be in conflict with or different from the data record version of 'Record 3' that is stored in a database coupled with an on-premises server, up to (ix) a button 1518 that allows the field operator to overwrite a data record version of 'Record n' that is stored within a database coupled with an on-premises server and that is in conflict with or different from a data record version of 'Record n' that is stored on the mobile client device, with the data record version of 'Record n' that is stored on the mobile client device, and (x) a button 1520 that allows the field operator to discard the data record version of 'Record n' that is stored within the mobile client device and that has been determined to be in conflict with or different from the data record version of 'Record n' that is stored in a database coupled with an on-premises server.

As shown in FIG. 15, one or more of the selectable buttons may be pre-selected for the field operator's review/confirmation (see shaded buttons 1512, 1514), wherein the pre-selection may be based on analysis of historical data representing prior selections made by the field operator, and a determination of a likely selection that the field operator may make in a similar or identical situation. The field operator may review the pre-selection(s) and may choose to accept the pre-selections or modify or override such pre-selections by manually selecting a different option or button through interface 1500.

Figure 16:
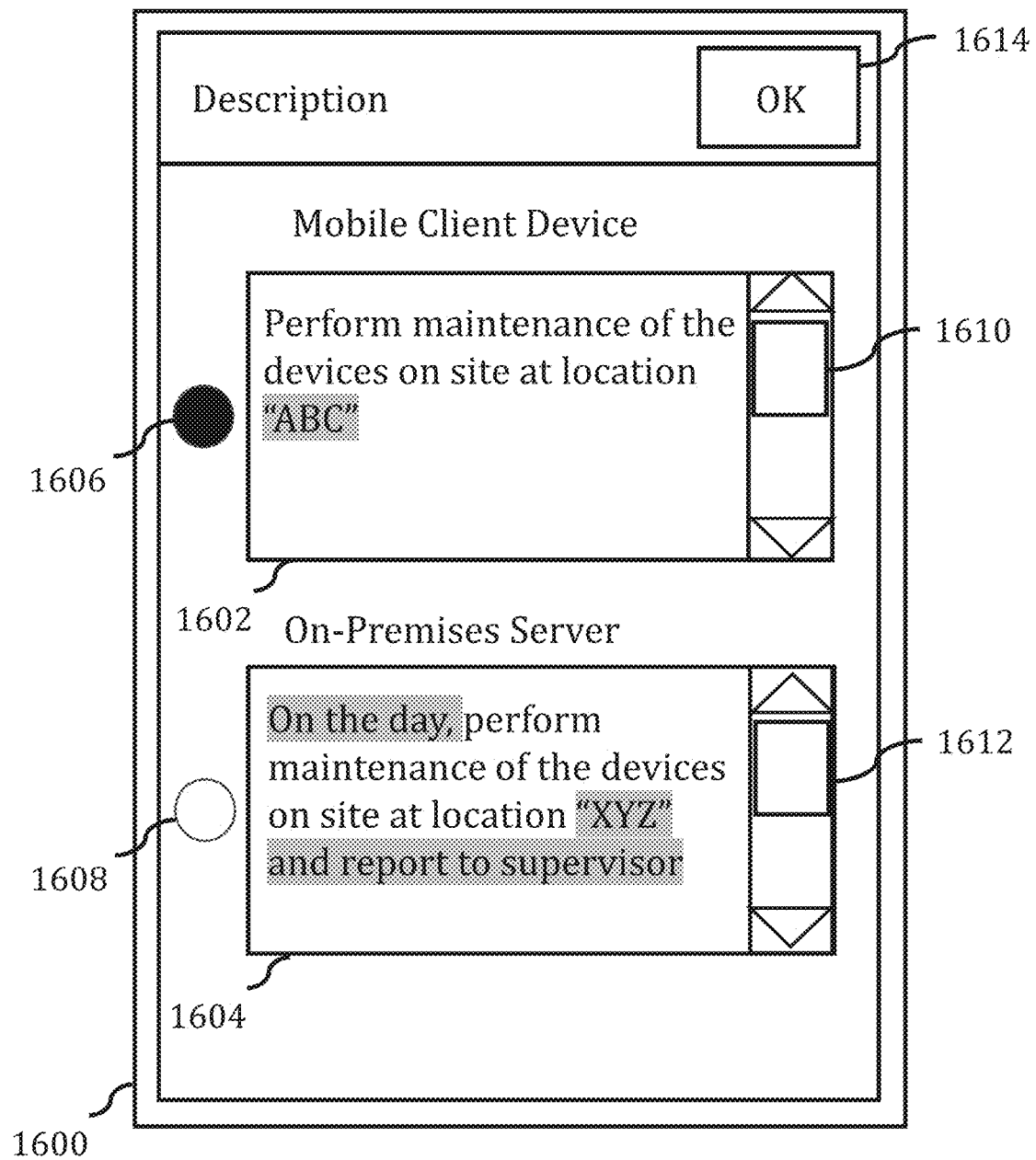

FIG. 16 illustrates an exemplary operator interface 1600 of a kind that may be implemented within and presented at a mobile client device at step 1408 of FIG. 14, to display to a field operator, through user interface 1600 that is implemented on the mobile client device, information identifying detected differences in version information corresponding to versions of the same data records that are respectively stored within the mobile client device and a database that is coupled with the on-premises server. As shown in FIG. 16, interface 1600 may include a plurality of display screens or sub-screens 1602, 1604, wherein sub-screen 1602 displays the contents of a version of a data record that is stored within the mobile client device, while sub-screen 1604 displays the contents of a version of a data record that is stored within the on-premises server. The interface 1600 additionally highlights for the field operator's convenience the differences in the two versions of the data records (see shaded portions of text in the respective display sub-screens 1602, 1604). Each sub-screen 1602, 1604 may respectively be provided with scroll bars 1610, 1612 and one or more radio buttons 1606, 1608 or other selection mechanisms to enable a field operator to select one of the data record versions over another. The interface 1600 is also provided with a confirmation tool (in this case the 'ok' button 1614) which allows the field operator to finalize or select one of the options presented through interface 1600.

Figure 17:
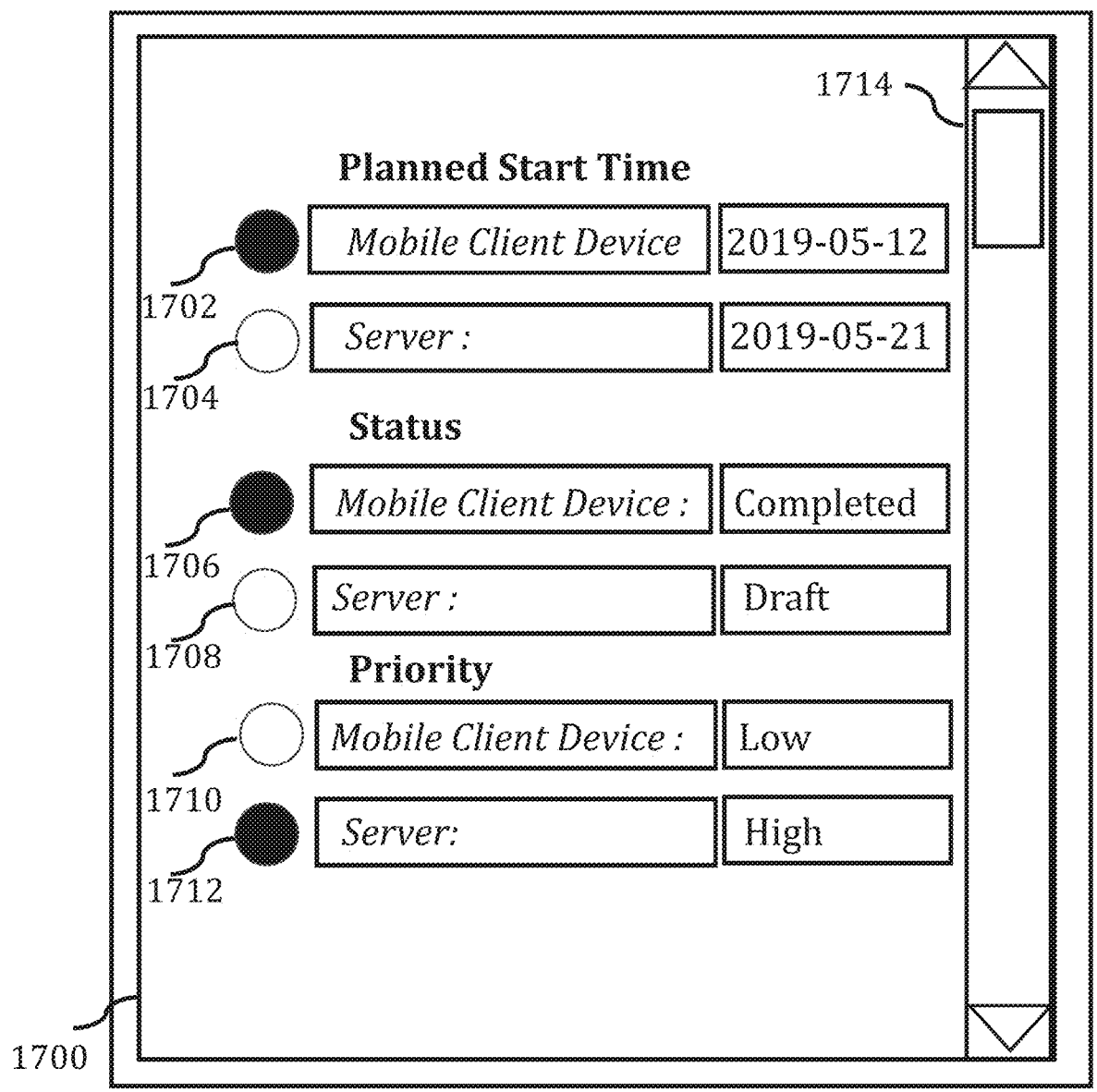
Figure 18:
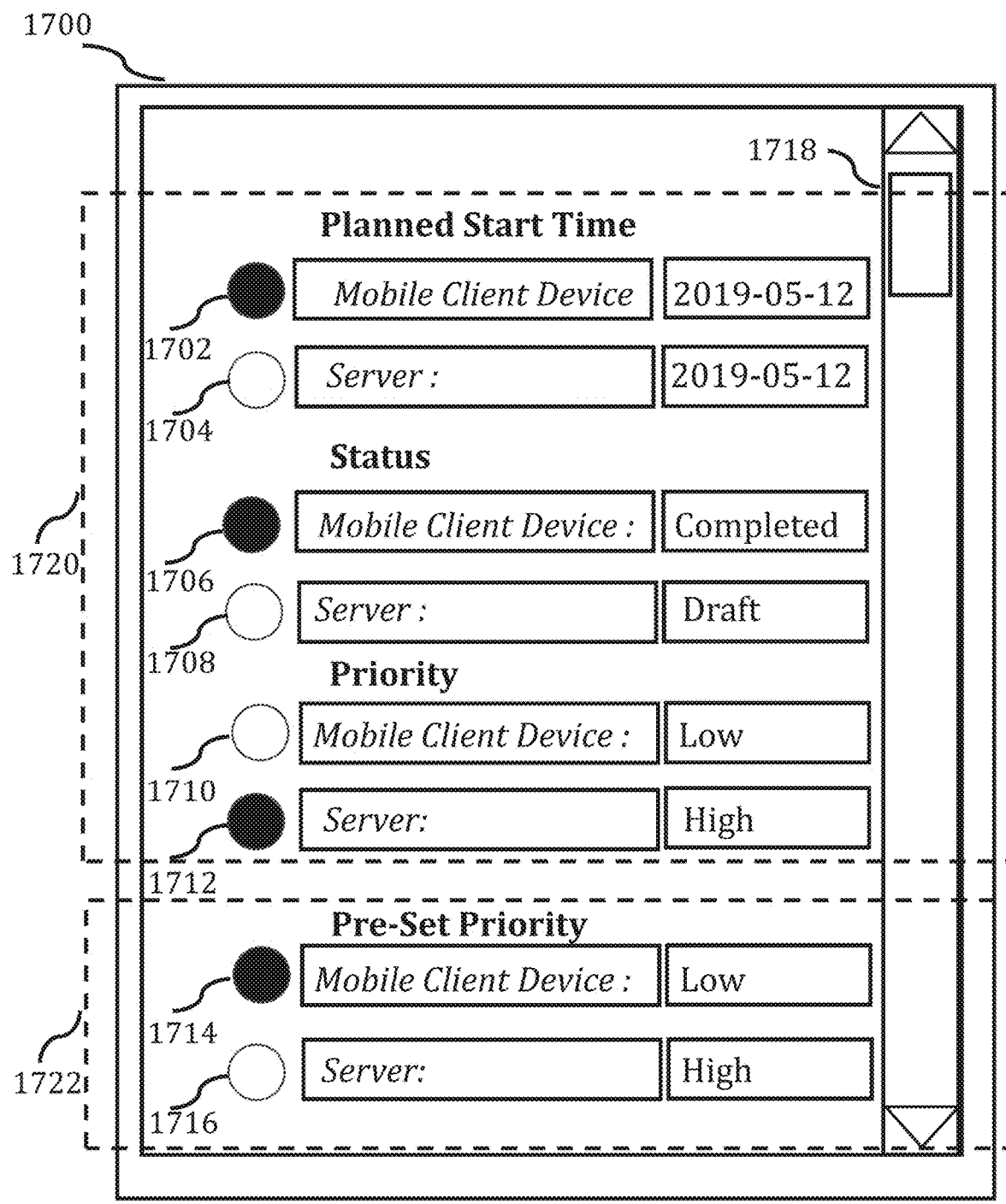

FIGS. 17 and 18 illustrate further embodiments of an exemplary mobile client device interface 1700 of a kind that may be implemented within and presented at a mobile client device at step 1408 of FIG. 14, to display to a field operator, through user interface 1700 that is implemented on the mobile client device, information identifying detected differences in version information corresponding to versions of the same data record that are respectively stored within the mobile client device and a database that is coupled with the on-premises server.

As shown in FIG. 17, interface 1700 may comparatively display the contents of one or more pairs of data record versions—each pair comprising a data record version stored within the mobile client device and a data record version stored within a database coupled with the on-premises server—so that the field operator can easily view and compare the contents of both versions and decide which version to retain and which version to overwrite/discard. Interface 1700 may be provided with scroll bar 1714 and one or more radio buttons 1702, 1704, 1706, 1708, 1710 and 1712 or other selection mechanisms to enable a field operator to select one of the data record versions over another.

FIG. 18 illustrates a further modification or embodiment of the interface 1700, where in addition to the features discussed above, the interface may also present the field operator with a suggested priority or selection between two versions of a data record. As discussed above, the pre-selection may be based on analysis of historical data representing prior selections made by the field operator, and a determination of a likely selection that the field operator may make in a similar or identical situation. The field operator may review the pre-selection(s) and may choose to accept the pre-selections or modify or override such pre-selections by manually selecting a different option or button through interface 1700.

In the interface 1700 shown in FIG. 18, a first group 1720 of compared data record versions does not have a pre-selection or a suggested priority between the compared data records which are respectively stored within the mobile client device and within the database, while a second group 1722 of compared data record versions does have a pre-selection or a suggested priority between the compared data records which are respectively stored within the mobile client device and within the database, and the field operator may review the pre-selection(s) or suggested priority and may choose to accept the pre-selection/suggested priority or modify or override such pre-selection/priority by manually selecting a different option or button (see buttons 1714, 1716) through the interface 1700.

In addition to the above, the invention enables resolution of data record version conflicts between a mobile client device and an on-premises server, based on historical data. FIG. 19 is a flowchart illustrating the method for enabling resolution of data record version conflicts between a mobile client device and an on-premises server, based on historical data.

Step 1902 comprises receiving through a user interface of a mobile client device, field operator inputs representing the field operator's instructions on resolving any detected version conflict between data records stored on the mobile client device and corresponding data records stored on the database coupled with the on-premises server.

At step 1904, the data records stored on the mobile client device and on the database coupled with the on-premises server, are synchronized based on the received field operator inputs.

Step 1906 comprises storing data representing the conflict resolution selections by the field operator, in a database—for example a database coupled with the on-premises server.

Step 1908 comprises detecting during a subsequent data synchronization session between the client mobile device and the on-premises server, any differences in version information relating to data records stored on the mobile client device when compared against version information relating to the corresponding data records stored on a database coupled with the on-premises server.

Step 1910 comprises displaying to the field operator, through a user interface implemented on the mobile client device, information identifying the detected differences in version information.

At step 1912, previously stored historical data representing conflict resolution selections by one or more operators (including optionally, by the field operator who is operating the mobile client device) is retrieved from a database where it has been stored.

Step 1914 comprises determining based on the retrieved historical data, one or more suggested field values or suggested field value selections for resolving the detected conflicts. Thereafter, step 1916 comprises presenting the one or more suggested field values or suggested field value selections to the field operator through a user interface implemented at the mobile client device—so that the field operator can either accept and proceed with the suggestions or alternatively can modify them before proceeding further.

FIG. 20 is a communication flow diagram illustrating communication flow between system entities for implementing a method for enabling resolution of data record version conflicts between a mobile client device and an on-premises server, based on historical data. The communication flow illustrated in FIG. 20 may be implemented for the purposes of implementing the method of FIG. 19.

Step 20002 comprises receiving at mobile client device 2012, field operator inputs representing the field operator's instructions on resolving any detected version conflict between data records stored on the mobile client device and corresponding data records stored on the database coupled with the on-premises server.

Step 20004 comprises synchronizing the data records stored on the mobile client device 2012 and on-premises server 2014 (or a database coupled with on-premises server 2014), based on the received field operator inputs.

Step 20006 comprises storing data representing the conflict resolution selections by the field operator, in a database 2016 that is coupled with the on-premises server 2014.

Step 20008 comprises initiating a subsequent data synchronization session between the mobile client device 2012 and the on-premises server 2014.

Step 20010 comprises retrieving by on-premises server 2014, from database 2016, previously stored historical data representing conflict resolution selections by one or more operators (including optionally, by the field operator who is operating the mobile client device 2012). At step 20012, the retrieved historical data is transmitted by on-premises server 2014 to mobile client device 2012—whereinafter, mobile client device 2012 determines based on the received historical data, one or more suggested field values or suggested field value selections for resolving detected conflicts between data record versions stored within the mobile client device 2012 and data record versions stored at on-premises server 2014 (or database 2016 that is coupled with on-premises server 2014). The one or more suggested field values or suggested field value selections may be displayed or presented to the field operator through a user interface implemented at the mobile client device 2012—so that the field operator can either accept and proceed with the suggestions or alternatively can modify them before proceeding further.

FIG. 21 illustrates an exemplary embodiment of a mobile client device 2100 configured in accordance with the teachings of the invention. The mobile client device 2100 may be configured to partially or wholly implement one or more of the methods discussed above.

Mobile client device 2100 comprises (i) an operator interface 2102 configured to enable a field operator to interface with and control mobile client device 2100 (ii) a processor 2104, (iii) a transceiver 2106 configured to send and receive data communications over a data network (for example a TCP/IP network, the internet, or any other data network) to enable mobile client device 2100 to communicate with any other network communication enabled device, and (iv) a transient or non-transient memory 2108.

Memory 2108 may include therewithin an operating system 2110 configured for managing device hardware and software resources and that provides common services for software programs implemented within mobile client device 2100. Memory 2108 may additionally include a processor implemented server interface 2112 configured to serve as a communication interface for enabling communication between mobile client device 2100 and an on-premises server. Memory 2108 may additionally include a processor implemented session controller 2114 configured to enable initiation, termination and session control of one or more data synchronization sessions between mobile client device 2100 and an on-premises server.

Memory 2108 may further include a processor implemented authentication controller 2116, configured to enable authentication of either or both of a field operator identity or the identity of the mobile client device by an on-premises server with which the mobile client device 2100 requests a data synchronization session. Memory 2108 may also include a processor implemented field device interface 2118 that is configured to enable wired or wireless communication between the mobile client device 2100 and one or more field devices or sensors—to enable the mobile client device 2100 to read data from said field devices or sensors, and/or to enable modification of one or more states or settings of said field devices or sensors through mobile client device 2100.

Memory 2108 may include a processor implemented imaging controller 2120 to enable image capture and/or generation of image based data records or data logs using an imaging apparatus (not shown) that is included within mobile client device 2100. Likewise memory 2108 may include a processor implemented audio controller 2122 to enable audio capture and/or generation of audio based data records or data logs using an audio recording apparatus (not shown) that is included within mobile client device 2100.

Memory 2108 may additionally include a processor implemented version selection controller 2124 that enables or provides suggestions for selection of versions of data records from among a plurality of such versions, for any of downloading into mobile client device 2100 from an on-premises server, or uploading from mobile client device 2100 onto an on-premises server (or onto a database coupled therewith), or for any other data synchronization purpose.

Memory 2108 may additionally include a processor implemented synchronization controller 2126 that is configured to control data synchronization sessions between mobile client device 2100 and an on-premises server, and to control the download and upload of data between said devices in accordance with any of the methods described above.

Memory 2108 includes a processor implemented interruption event controller 2028 that is configured to monitor interruption events within data synchronization sessions between mobile client device 2100 and an on-premises server, and to resume download of data records that have not been downloaded prior to interruption of the session, in accordance with any of the methods described above.

Memory 2108 may include a non-transitory memory based record database 2130 configured to store one or more data records therewithin.

Memory 2108 may also include a processor implemented historical data analyzer 2132 configured to receive historical data concerning prior data record versions selections by one or more field operators, and to suggest or display one or more suggested selections or values for selection to resolve data versions conflicts between the mobile client device 2100 and an on-premises server (in accordance with any of the methods of the present invention).

Memory 2108 may also include a processor implemented conflict resolution controller 2134 configured to receive field operator inputs through the mobile client device 2100 and use such field operator inputs to resolve data versions conflicts between the mobile client device 2100 and an on-premises server (in accordance with any of the methods of the present invention).

FIG. 22 illustrates an exemplary embodiment of an on-premises server 2200 configured in accordance with the teachings of the invention.

On-premises server 2200 comprises (i) an operator interface 2202 configured to enable an operator (for example, a console operator) to interface with and control on-premises server 2200 (ii) a processor 2204, (iii) a transceiver 2206 configured to send and receive data communications over a data network (for example a TCP/IP network, the internet, or any other data network) to enable on-premises server 2200 to communicate with any other network communication enabled device, and (iv) a transient or non-transient memory 2208.

Memory 2208 may include therewithin an operating system 2210 configured for managing device hardware and software resources and that provides common services for software programs implemented within on-premises server 2200. Memory 2208 may additionally include a processor implemented session controller 2212 configured to enable initiation, termination and session control of one or more data synchronization sessions between on-premises server 2200 and one or more mobile client devices.

Memory 2208 may further include a processor implemented authentication controller 2214, configured to enable authentication of either or both of a field operator identity or the identity of a mobile client device by on-premises server 2200 when requested for a data synchronization session by a mobile client device. Memory 2208 may also include a processor implemented database interface 2216 that is configured to enable wired or wireless communication between the on-premises server 2200 and one or more databases communicably coupled therewith for storage and retrieval of data records—so to enable the on-premises server 2200 to store and retrieve data on and from such database(s).

Memory 2208 may include a processor implemented mobile client device interface 2218 configured to serve as a communication interface for enabling communication between the on-premises server 2200 and one or more mobile client devices.

Memory 2208 further includes a processor implemented data record versioner (or data record version controller) 2220 configured to enable generation, storage, and logical retrieval and maintenance of a plurality of versions of one or data records, and for maintenance, retrieval and analysis of version information and/or version attributes of such data record versions.

Memory 2200 includes a processor implemented data record selection controller 2222 configured to enable selection of one or more data records from among a plurality of data records associated with a field operator, based on one or more data record selection parameters. In an embodiment, data record selection controller 2222 may be configured to select data records based on one or more of the methods described above.

Memory 2208 includes a processor implemented version selection controller 2224 configured to enable selection of one or more versions of a data record from among a plurality of versions of a data record associated with a field operator, based on one or more version synchronization rules. Selection of versions of data records may be implemented for any of downloading onto a mobile client device from on-premises server 2200, or uploading from a mobile client device onto the on-premises server (or onto a database coupled therewith) 2200, or for any other data synchronization purpose. In an embodiment, version selection controller 2224 may be configured to select data record versions based on one or more of the methods described above.

Memory 2208 may additionally include a processor implemented synchronization controller 2226 that is configured to control data synchronization sessions between on-premises server 2200 and one or more mobile client devices, and to control the download and upload of data between said devices in accordance with any of the methods described above.

Memory 2208 may also include a processor implemented interruption event controller 2228 that may be configured to monitor interruption events within data synchronization sessions between a mobile client device and on-premises server 2200, and to enable or effect resumption of transmission of data records that have not been transmitted to the mobile client device, prior to interruption of the session, in accordance with any of the methods described above.

Memory 2208 may also include a processor implemented historical data retrieval controller 2230 configured to retrieve historical data concerning prior data record versions selections by one or more field operators from a database, and optionally configured to suggest or display one or more suggested selections or values for selection to resolve data versions conflicts between a mobile client device and the on-premises server 2200 (for example, in accordance with any of the methods of the present invention).

Memory 2208 may also include a processor implemented conflict resolution controller 2232 configured to receive field operator inputs from a mobile client device and to use such field operator inputs to resolve data versions conflicts between the mobile client device and the on-premises server 2200 (for example, in accordance with any of the methods of the present invention).

In addition to the above, the invention may provide a particular method for optimizing data synchronization between an industrial plant database system and one or more mobile client devices. The method comprises (i) retrieving a set of parameters associated with an operator identifier, the set of parameters comprising one or more data record selection parameters, wherein the one or more data record selection parameters define criteria for selecting data records from a first set of data records associated with the operator identifier within a database, (ii) retrieving a set of synchronization rules associated with the operator identifier, the set of synchronization rules comprising one or more version synchronization rules, wherein each version synchronization rule defines criteria for selecting one data record version from among a plurality of data record versions associated with the operator identifier, for synchronization between the database and a mobile client device that has been associated with the operator identifier, (iii) responsive to initiation of a data synchronization session between the mobile client device and the industrial plant database system (a) retrieving from the first set of data records associated with the operator identifier, a second sub-set of data records that has been selected based on the set of parameters, (b) identifying within the second sub-set of data records, one or more data records that have multiple data record versions stored within the database, (c) selecting from among the second sub-set of data records, a third sub-set of data records comprising at least one of (1) one or more data records within the second sub-set of data records that have only a single data record version stored within the database, and (2) for one or more data records within the second sub-set of data records and that have a plurality of data record versions stored within the database, a selected data record version from among said plurality of data record versions, wherein the selected data record version is selected based on one or more of the version synchronization rules, and (d) synchronizing the mobile client device with the database by transmitting the third sub-set of data records from the database to the mobile client device.

In an embodiment of the above method, the transmitted third sub-set of data records does not include multiple data record versions of any data record. In another method embodiment, (i) one or more of the data record selection parameters within the set of parameters are defined based on operator input, and (ii) one or more of the version synchronization rules within the set of synchronization rules are defined based on historical data corresponding to prior data record version selection associated with the operator identifier or with a group with which the operator identifier is associated.

In a particular embodiment of the method, the third sub-set of data records selected from the second sub-set of data records excludes any data record version of a data record that is identical to or that has been generated prior to a data record version of the same data record that is stored on the mobile client device. In this embodiment, the method may include the step of comparing version numbers of data records stored on the mobile client device with version numbers of corresponding data records within the second sub-set of data records, for excluding from the third sub-set of data records, any data record versions of a data record that is identical to or that has been generated prior to a data record version of the same data record that is stored on the mobile client device.

In a more particular embodiment of the method, (i) responsive to interruption of the data synchronization session between the mobile client device and the industrial plant database system, identifying a fourth sub-set of data records within the third sub-set of data records that have not been fully transmitted from the database to the mobile client device within the data synchronization session, and (ii) upon resumption of the data synchronization between the mobile client device and the industrial plant database system, transmitting the fourth sub-set of data records from the database to the mobile client device without retransmitting data records within the third sub-set of data records that have been fully transmitted to the mobile client device prior to interruption of the data synchronization session.

In another embodiment, the method includes (i) for one or more data records included within the third sub-set of data records and that have a plurality of data record versions stored within the database, displaying on a display of the mobile client device (a) information corresponding to the plurality of data record versions corresponding to such data record, and (b) information identifying which of the plurality of data record versions, corresponding to such data record, has been selected for the third sub-set of data records. This embodiment may additionally include (i) receiving through operator input at the mobile client device, information identifying substitution of a first data record version of a particular data record that has been included within the third sub-set of data records, with a second data record version of the particular data record, within the third sub-set of data records, and (ii) modifying the third sub-set of data records by substituting the first data record version with the second data record version.

In another embodiment of the method selection of data record versions of the third sub-set of data records is implemented at the mobile client device based on historical data corresponding to prior data record version selection that has been transmitted from the industrial plant database system to the mobile client device.

In another embodiment, the invention provides a system for optimizing data synchronization between an industrial plant database system and one or more mobile client devices. The system comprises at least one server configured to implement the steps of (i) retrieving a set of parameters associated with an operator identifier, the set of parameters comprising one or more data record selection parameters, wherein the one or more data record selection parameters define criteria for selecting data records from a first set of data records associated with the operator identifier within a database, (ii) retrieving a set of synchronization rules associated with the operator identifier, the set of synchronization rules comprising one or more version synchronization rules, wherein each version synchronization rule defines criteria for selecting one data record version from among a plurality of data record versions associated with the operator identifier, for synchronization between the database and a mobile client device that has been associated with the operator identifier, (iii) responsive to initiation of a data synchronization session between the mobile client device and the industrial plant database system (a) retrieving from the set of first data records associated with the operator identifier, a second sub-set of data records that has been selected based on the set of parameters, (b) identifying within the second sub-set of data records, one or more data records that have multiple data record versions stored within the database, (c) from among the second sub-set of data records, selecting or receiving a selection of, a third sub-set of data records comprising at least one of (1) one or more data records from within the second sub-set of data records that have only a single data record version stored within the database, and (2) for one or more data records within the second sub-set of data records and that have a plurality of data record versions stored within the database, a selected data record version from among said plurality of data record versions, wherein the selected data record version is selected based on one or more of the version synchronization rules, and (d) synchronizing the mobile client device with the database by transmitting the third sub-set of data records from the database to the mobile client device.

In an embodiment of the system, the server is configured such that the transmitted third sub-set of data records does not include multiple data record versions of any data record.

In another embodiment of the system, the server is configured such that (i) one or more of the data record selection parameters within the set of parameters are defined based on operator input, and (ii) one or more of the version synchronization rules within the set of synchronization rules are defined based on historical data corresponding to prior data record version selection associated with the operator identifier or with a group with which the operator identifier is associated.

In a particular system embodiment, the server is configured such that the transmitted third sub-set of data records excludes any data record version of a data record that is identical to or that has been generated prior to a data record version of the same data record that is stored on the mobile client device. In a further embodiment, the server is configured such that subsequent to comparing version numbers of data records stored on the mobile client device with version numbers of corresponding data records within the second sub-set of data records, any data record versions of a data record that is identical to or that has been generated prior to a data record version of the same data record that is stored on the mobile client device are excluded from the third sub-set of data records.

In an embodiment, the system may be configured for (i) responsive to interruption of the data synchronization session between the mobile client device and the industrial plant database system, identifying a fourth sub-set of data records within the third sub-set of data records that have not been fully transmitted from the database to the mobile client device within the data synchronization session, and (ii) upon resumption of the data synchronization between the mobile client device and the industrial plant database system, transmitting the fourth sub-set of data records from the database to the mobile client device without retransmitting data records within the third sub-set of data records that have been fully transmitted to the mobile client device prior to interruption of the data synchronization session.

The system may be configured for (i) displaying on a display of the mobile client device, for one or more data records included within the third sub-set of data records and that have a plurality of data record versions stored within the database (a) information corresponding to the plurality of data record versions corresponding to such data record, and (b) information identifying which of the plurality of data record versions, corresponding to such data record, has been selected for the third sub-set of data records.

In an embodiment, the system may be configured for (i) receiving through operator input at the mobile client device, information identifying substitution of a first data record version of a particular data record that has been included within the third sub-set of data records, with a second data record version of the particular data record, within the third sub-set of data records, and (ii) modifying the third sub-set of data records by substituting the first data record version with the second data record version.

In another embodiment, the system may be configured such that selection of data record versions of the third sub-set of data records is implemented at the mobile client device based on historical data corresponding to prior data record version selection that has been transmitted from the industrial plant database system to the mobile client device.

The invention yet further provides a computer program product for optimizing data synchronization between an industrial plant database system and one or more mobile client devices. The computer program product comprises a non-transitory computer usable medium having a computer readable program code embodied therein, the computer readable program code comprising instructions for implementing within a processor based computing system, the steps of (i) retrieving a set of parameters associated with an operator identifier, the set of parameters comprising one or more data record selection parameters, wherein the one or more data record selection parameters define criteria for selecting data records from a first set of data records associated with the operator identifier within a database, (ii) retrieving a set of synchronization rules associated with the operator identifier, the set of synchronization rules comprising one or more version synchronization rules, wherein each version synchronization rule defines criteria for selecting one data record version from among a plurality of data record versions associated with the operator identifier, for synchronization between the database and a mobile client device that has been associated with the operator identifier, (iii) responsive to initiation of a data synchronization session between the mobile client device and the industrial plant database system (a) retrieving from the first set of data records associated with the operator identifier, a second sub-set of data records that has been selected based on the set of parameters, (b) identifying within the second sub-set of data records, one or more data records that have multiple data record versions stored within the database, (c) selecting from among the second sub-set of data records, a third sub-set of data records comprising at least one of (1) one or more data records from within the second sub-set of data records that have only a single data record version stored within the database, and (2) for one or more data records within the second sub-set of data records and that have a plurality of data record versions stored within the database, a selected data record version from among said plurality of data record versions, wherein the selected data record version is selected based on one or more of the version synchronization rules, and (d) synchronizing the mobile client device with the database by transmitting the third sub-set of data records from the database to the mobile client device.

FIG. 23 illustrates an exemplary computer system 2300 according to which various embodiments of the present invention may be implemented.

System 2300 includes computer system 2302 which in turn comprises one or more processors 2304 and at least one memory 2306. Processor 2304 is configured to execute program instructions—and may be a real processor or a virtual processor. It will be understood that computer system 2302 does not suggest any limitation as to scope of use or functionality of described embodiments. The computer system 2302 may include, but is not be limited to, one or more of a general-purpose computer, a programmed microprocessor, a micro-controller, an integrated circuit, and other devices or arrangements of devices that are capable of implementing the steps that constitute the method of the present invention. Exemplary embodiments of a computer system 2302 in accordance with the present invention may include one or more servers, desktops, laptops, tablets, smart phones, mobile phones, mobile communication devices, tablets, phablets and personal digital assistants. In an embodiment of the present invention, the memory 2306 may store software for implementing various embodiments of the present invention. The computer system 2302 may have additional components. For example, the computer system 2302 may include one or more communication channels 2308, one or more input devices 2310, one or more output devices 2312, and storage 2314. An interconnection mechanism (not shown) such as a bus, controller, or network, interconnects the components of the computer system 2302. In various embodiments of the present invention, operating system software (not shown) provides an operating environment for various softwares executing in the computer system 2302 using a processor 2304, and manages different functionalities of the components of the computer system 2302.

The communication channel(s) 2308 allow communication over a communication medium to various other computing entities. The communication medium provides information such as program instructions, or other data in a communication media. The communication media includes, but is not limited to, wired or wireless methodologies implemented with an electrical, optical, RF, infrared, acoustic, microwave, Bluetooth or other transmission media.

The input device(s) 2310 may include, but is not limited to, a touch screen, a keyboard, mouse, pen, joystick, trackball, a voice device, a scanning device, or any another device that is capable of providing input to the computer system 2302. In an embodiment of the present invention, the input device(s) 2310 may be a sound card or similar device that accepts audio input in analog or digital form. The output device(s) 2312 may include, but not be limited to, a user interface on CRT, LCD, LED display, or any other display associated with any of servers, desktops, laptops, tablets, smart phones, mobile phones, mobile communication devices, tablets, phablets and personal digital assistants, printer, speaker, CD/DVD writer, or any other device that provides output from the computer system 2302.

The storage 2314 may include, but not be limited to, magnetic disks, magnetic tapes, CD-ROMs, CD-RWs, DVDs, any types of computer memory, magnetic stripes, smart cards, printed barcodes or any other transitory or non-transitory medium which can be used to store information and can be accessed by the computer system 2302. In various embodiments of the present invention, the storage 2314 may contain program instructions for implementing any of the described embodiments.

In an embodiment of the present invention, the computer system 2302 is part of a distributed network or a part of a set of available cloud resources.

The present invention may be implemented in numerous ways including as a system, a method, or a computer program product such as a computer readable storage medium or a computer network wherein programming instructions are communicated from a remote location.

The present invention may suitably be embodied as a computer program product for use with the computer system 2302. The method described herein is typically implemented as a computer program product, comprising a set of program instructions that is executed by the computer system 2302 or any other similar device. The set of program instructions may be a series of computer readable codes stored on a tangible medium, such as a computer readable storage medium (storage 2314), for example, diskette, CD-ROM, ROM, flash drives or hard disk, or transmittable to the computer system 2302, via a modem or other interface device, over either a tangible medium, including but not limited to optical or analogue communications channel(s) 2308. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the Internet or a mobile telephone network. The series of computer readable instructions may embody all or part of the functionality previously described herein.

Based on the above, it would be apparent that the present invention offers significant advantages. In particular, the invention enables time and data efficient synchronization of data records between a centralized server/an on-premises server, in a manner that ensures that a field operator has access to all data records necessary to complete her/his tasks during a shift or assignment, while simultaneously ensuring optimized data integrity and data record version control. Yet more specific advantages offered by implementation of the present invention includes:

enabling a significant reduction in the amount of data that requires to be downloaded into a mobile client device during any data synchronization session automating data synchronization processes, reducing field operator inputs necessary for effecting the data synchronization processes, and simultaneously improving the field operator interfaces for selection of data records for the data synchronization processes eliminating uploading and downloading of data records that are already available on the downloading device, so as to improve efficiency of the data synchronization processes automating the process of data versioning and ensuring that only required versions of a data record are uploaded or downloaded during a data synchronization session, and intelligent resumption of a data synchronization session to eliminate retransmission of redundant data or information.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims. Additionally, the invention illustratively disclose herein suitably may be practiced in the absence of any element which is not specifically disclosed herein—and in a particular embodiment that is specifically contemplated, the invention is intended to be practiced in the absence of any one or more element which are not specifically disclosed herein.

We claim:

1. A method for optimizing data synchronization between an industrial plant database system and one or more mobile client devices, the method comprising:
    retrieving a set of parameters associated with an operator identifier, the set of parameters comprising one or more data record selection parameters, wherein the one or more data record selection parameters define criteria for selecting data records from a first set of data records associated with the operator identifier within a database;
    retrieving a set of synchronization rules associated with the operator identifier, the set of synchronization rules comprising one or more version synchronization rules, wherein each version synchronization rule defines criteria for selecting one data record version from among a plurality of data record versions associated with the operator identifier, for synchronization between the database and a mobile client device that has been associated with the operator identifier; and
    responsive to initiation of a data synchronization session between the mobile client device and the industrial plant database system:
        retrieving from the first set of data records associated with the operator identifier, a second sub-set of data records that has been selected based on the set of parameters;
        identifying within the second sub-set of data records, one or more data records that have multiple data record versions stored within the database;
        selecting from among the second sub-set of data records, a third sub-set of data records comprising at least one of:
            one or more data records from within the second sub-set of data records that have only a single data record version stored within the database; and
            for one or more data records within the second sub-set of data records and that have a plurality of data record versions stored within the database, a selected data record version from among said plurality of data record versions, wherein the selected data record version is selected based on one or more of the version synchronization rules; and
        synchronizing the mobile client device with the database by transmitting the third sub-set of data records from the database to the mobile client device.

2. The method as claimed in claim 1, wherein the transmitted third sub-set of data records does not include multiple data record versions of any data record.

3. The method as claimed in claim 1, wherein:
    one or more of the data record selection parameters within the set of parameters are defined based on operator input; and
    one or more of the version synchronization rules within the set of synchronization rules are defined based on historical data corresponding to prior data record version selection associated with the operator identifier or with a group with which the operator identifier is associated.

4. The method as claimed in claim 1, wherein the third sub-set of data records selected from the second sub-set of data records excludes any data record version of a data record that is identical to or that has been generated prior to a data record version of the same data record that is stored on the mobile client device.

5. The method as claimed in claim 4, further comprising the step of comparing version numbers of data records stored on the mobile client device with version numbers of corresponding data records within the second sub-set of data records, for excluding from the third sub-set of data records, any data record versions of a data record that is identical to or that has been generated prior to a data record version of the same data record that is stored on the mobile client device.

6. The method as claimed in claim 1, further comprising:
    responsive to interruption of the data synchronization session between the mobile client device and the industrial plant database system, identifying a fourth sub-set of data records within the third sub-set of data records that have not been fully transmitted from the database to the mobile client device within the data synchronization session; and
    upon resumption of the data synchronization between the mobile client device and the industrial plant database system, transmitting the fourth sub-set of data records from the database to the mobile client device without retransmitting data records within the third sub-set of data records that have been fully transmitted to the mobile client device prior to interruption of the data synchronization session.

7. The method as claimed in claim 1, further comprising:
    for one or more data records included within the third sub-set of data records and that have a plurality of data record versions stored within the database, displaying on a display of the mobile client device:
    information corresponding to the plurality of data record versions corresponding to such data record; and
    information identifying which of the plurality of data record versions, corresponding to such data record, has been selected for the third sub-set of data records.

8. The method as claimed in claim 7, further comprising:
    receiving through operator input at the mobile client device, information identifying substitution of a first data record version of a particular data record that has been included within the third sub-set of data records, with a second data record version of the particular data record, within the third sub-set of data records stored in the database; and
    modifying the third sub-set of data records by substituting the first data record version with the second data record version.

9. The method as claimed in claim 1, wherein selection of data record versions of the third sub-set of data records is implemented at the mobile client device based on historical data corresponding to prior data record version selection that has been transmitted from the industrial plant database system to the mobile client device.

10. The method as claimed in claim 3, wherein the one or more of the version synchronization rules within the set of synchronization rules are defined based on historical data comprising one or more suggested field values or suggested field value selections associated with the data record version selection.

11. A system for optimizing data synchronization between an industrial plant database system and one or more mobile client devices, the system comprising at least one server configured to implement the steps of:

retrieving a set of parameters associated with an operator identifier, the set of parameters comprising one or more data record selection parameters, wherein the one or more data record selection parameters define criteria for selecting data records from a first set of data records associated with the operator identifier within a database;

retrieving a set of synchronization rules associated with the operator identifier, the set of synchronization rules comprising one or more version synchronization rules, wherein each version synchronization rule defines criteria for selecting one data record version from among a plurality of data record versions associated with the operator identifier, for synchronization between the database and a mobile client device that has been associated with the operator identifier; and responsive to initiation of a data synchronization session between the mobile client device and the industrial plant database system:

retrieving from the first set of data records associated with the operator identifier, a second sub-set of data records that has been selected based on the set of parameters;

identifying within the second sub-set of data records, one or more data records that have multiple data record versions stored within the database;

from among the second sub-set of data records, selecting or receiving a selection of, a third sub-set of data records comprising at least one of:

one or more data records from within the second sub-set of data records that have only a single data record version stored within the database; and for one or more data records within the second sub-set of data records and that have a plurality of data record versions stored within the database, a selected data record version from among said plurality of data record versions, wherein the selected data record version is selected based on one or more of the version synchronization rules; and synchronizing the mobile client device with the database by transmitting the third sub-set of data records from the database to the mobile client device.

12. The system as claimed in claim 11, wherein the at least one server is configured such that the transmitted third sub-set of data records does not include multiple data record versions of any data record.

13. The system as claimed in claim 11, wherein the at least one server is configured such that:

one or more of the data record selection parameters within the set of parameters are defined based on operator input; and one or more of the version synchronization rules within the set of synchronization rules are defined based on historical data corresponding to prior data record version selection associated with the operator identifier or with a group with which the operator identifier is associated.

14. The system as claimed in claim 11, wherein the at least one server is configured such that the transmitted third sub-set of data records excludes any data record version of a data record that is identical to or that has been generated prior to a data record version of the same data record that is stored on the mobile client device.

15. The system as claimed in claim 14, wherein subsequent to comparing version numbers of data records stored on the mobile client device with version numbers of corresponding data records within the second sub-set of data records, any data record versions of a data record that is identical to or that has been generated prior to a data record version of the same data record that is stored on the mobile client device are excluded from the third sub-set of data records.

16. The system as claimed in claim 11, configured for:

responsive to interruption of the data synchronization session between the mobile client device and the industrial plant database system, identifying a fourth sub-set of data records within the third sub-set of data records that have not been fully transmitted from the database to the mobile client device within the data synchronization session; and upon resumption of the data synchronization between the mobile client device and the industrial plant database system, transmitting the fourth sub-set of data records from the database to the mobile client device without retransmitting data records within the third sub-set of data records that have been fully transmitted to the mobile client device prior to interruption of the data synchronization session.

17. The system as claimed in claim 11, configured for:

displaying on a display of the mobile client device, for one or more data records included within the third sub-set of data records and that have a plurality of data record versions stored within the database:

information corresponding to the plurality of data record versions corresponding to such data record; and information identifying which of the plurality of data record versions, corresponding to such data record, has been selected for the third sub-set of data records.

18. The system as claimed in claim 17, configured for:

receiving through operator input at the mobile client device, information identifying substitution of a first data record version of a particular data record that has been included within the third sub-set of data records, with a second data record version of the particular data record, within the third sub-set of data records stored in the database; and modifying the third sub-set of data records by substituting the first data record version with the second data record version.

19. The system as claimed in claim 11, configured such that selection of data record versions of the third sub-set of data records is implemented at the mobile client device based on historical data corresponding to prior data record version selection that has been transmitted from the industrial plant database system to the mobile client device.

20. A computer program product for optimizing data synchronization between an industrial plant database system and one or more mobile client devices, the computer program product comprising a non-transitory computer usable medium having a computer readable program code embodied therein, the computer readable program code comprising instructions for implementing within a processor based computing system, the steps of:

retrieving a set of parameters associated with an operator identifier, the set of parameters comprising one or more data record selection parameters, wherein the one or more data record selection parameters define criteria for selecting data records from a first set of data records associated with the operator identifier within a database;

retrieving a set of synchronization rules associated with the operator identifier, the set of synchronization rules comprising one or more version synchronization rules, wherein each version synchronization rule defines criteria for selecting one data record version from among a plurality of data record versions associated with the operator identifier, for synchronization between the database and a mobile client device that has been associated with the operator identifier; and responsive to initiation of a data synchronization session between the mobile client device and the industrial plant database system:

retrieving from the first set of data records associated with the operator identifier, a second sub-set of data records that has been selected based on the set of parameters;

identifying within the second sub-set of data records, one or more data records that have multiple data record versions stored within the database;

selecting from among the second sub-set of data records, a third sub-set of data records comprising at least one of:

one or more data records from within the second sub-set of data records that have only a single data record version stored within the database; and for one or more data records within the second sub-set of data records and that have a plurality of data record versions stored within the database, a selected data record version from among said plurality of data record versions, wherein the selected data record version is selected based on one or more of the version synchronization rules; and synchronizing the mobile client device with the database by transmitting the third sub-set of data records from the database to the mobile client device.

\* \* \* \* \*